(12) United States Patent
Smith

(10) Patent No.: US 11,301,922 B2
(45) Date of Patent: Apr. 12, 2022

(54) SYSTEM AND METHOD FOR PROVIDING COMPREHENSIVE VEHICLE INFORMATION

(71) Applicant: AUTO I.D., Inc., Hendersonville, TN (US)

(72) Inventor: Sean Smith, Hendersonville, TN (US)

(73) Assignee: AUTO I.D., INC., Nashville, TN (US)

( * ) Notice: Subject to any disclaimer, the term of this patent is extended or adjusted under 35 U.S.C. 154(b) by 0 days.

(21) Appl. No.: 16/669,250

(22) Filed: Oct. 30, 2019

(65) Prior Publication Data

US 2020/0065885 A1 Feb. 27, 2020

Related U.S. Application Data

(63) Continuation of application No. 14/080,416, filed on Nov. 14, 2013, now abandoned, which is a continuation-in-part of application No. 13/297,438, filed on Nov. 16, 2011, now abandoned.

(60) Provisional application No. 61/415,207, filed on Nov. 18, 2010.

(51) Int. Cl.
*G06Q 30/06* (2012.01)
*G06Q 30/02* (2012.01)

(52) U.S. Cl.
CPC ..... *G06Q 30/0635* (2013.01); *G06Q 30/0278* (2013.01); *G06Q 30/0283* (2013.01); *G06Q 30/0621* (2013.01); *G06Q 30/0623* (2013.01)

(58) Field of Classification Search
CPC ........... G06Q 30/0278; G06Q 30/0283; G06Q 30/0621; G06Q 30/0623; G06Q 30/0635
See application file for complete search history.

(56) References Cited

U.S. PATENT DOCUMENTS

| | | |
|---|---|---|
| 4,989,144 A | 1/1991 | Barnett, III |
| 5,120,704 A | 6/1992 | Lechter et al. |
| 5,201,010 A | 4/1993 | Deaton et al. |
| 5,216,612 A | 6/1993 | Cornett et al. |

(Continued)

FOREIGN PATENT DOCUMENTS

| | | |
|---|---|---|
| EP | 0 749 081 | 12/1996 |
| EP | 1 122 664 | 8/2001 |

(Continued)

OTHER PUBLICATIONS

U.S. Appl. No. 13/297,438, Web-Based System and Method for Providing Comprehensive Vehicle Build Information, filed Nov. 16, 2011.

(Continued)

*Primary Examiner* — George C Neurauter, Jr.
(74) *Attorney, Agent, or Firm* — Knobbe Martens Olson & Bear, LLP

(57) ABSTRACT

Systems and methods are provided for determining additional vehicle data for a vehicle based on a vehicle identifier, such as a vehicle identification number (VIN). Based on the VIN, manufacturer codes, model codes, and other additional manufacturer information can be determined. The manufacturer codes and/or model codes can be used in determining a list of options on the vehicle. This information can be used by a variety of systems in determining more accurate vehicle specifications to yield more accurate vehicle evaluations based at least in part on the list options.

6 Claims, 18 Drawing Sheets

(56) References Cited

U.S. PATENT DOCUMENTS

| | | | |
|---|---|---|---|
| 5,488,360 A | 1/1996 | Ray | |
| 5,532,838 A | 7/1996 | Barbari | |
| 5,587,575 A * | 12/1996 | Leitner | B60R 13/10 |
| | | | 235/375 |
| 5,630,070 A | 5/1997 | Dietrich et al. | |
| 5,748,098 A | 5/1998 | Grace | |
| 5,765,143 A | 6/1998 | Sheldon et al. | |
| 5,819,234 A | 10/1998 | Slavin et al. | |
| 5,878,403 A | 3/1999 | DeFrancesco | |
| 5,940,812 A | 8/1999 | Tengel et al. | |
| 5,950,169 A | 9/1999 | Borghesi et al. | |
| 5,963,129 A | 10/1999 | Warner | |
| 5,995,947 A | 11/1999 | Fraser et al. | |
| 6,006,201 A | 12/1999 | Berent et al. | |
| 6,038,554 A | 3/2000 | Vig | |
| 6,052,065 A | 4/2000 | Glover | |
| 6,052,068 A | 4/2000 | Price R-W et al. | |
| 6,076,064 A | 6/2000 | Rose, Jr. | |
| 6,126,332 A | 10/2000 | Cubbage et al. | |
| 6,154,152 A | 11/2000 | Ito | |
| 6,182,048 B1 | 1/2001 | Osborn et al. | |
| 6,208,979 B1 | 3/2001 | Sinclair | |
| 6,236,977 B1 | 5/2001 | Verba et al. | |
| 6,278,936 B1 | 8/2001 | Jones | |
| 6,282,517 B1 | 8/2001 | Wolfe et al. | |
| 6,330,499 B1 | 12/2001 | Chou et al. | |
| 6,330,546 B1 | 12/2001 | Gopinathan et al. | |
| 6,430,539 B1 | 8/2002 | Lazarus et al. | |
| 6,516,239 B1 | 2/2003 | Madden et al. | |
| 6,587,841 B1 | 7/2003 | DeFrancesco | |
| 6,609,108 B1 * | 8/2003 | Pulliam | G06Q 10/087 |
| | | | 705/26.5 |
| 6,714,859 B2 | 3/2004 | Jones | |
| 6,738,748 B2 | 5/2004 | Wetzer | |
| 6,754,564 B2 | 6/2004 | Newport | |
| 6,760,794 B2 | 7/2004 | Deno et al. | |
| 6,772,145 B2 | 8/2004 | Shishido | |
| 6,804,606 B2 | 10/2004 | Jones | |
| 6,839,682 B1 | 1/2005 | Blume et al. | |
| 6,904,359 B2 | 6/2005 | Jones | |
| 6,938,021 B2 | 8/2005 | Shear et al. | |
| 6,959,281 B1 | 10/2005 | Freeling et al. | |
| 6,980,963 B1 * | 12/2005 | Hanzek | G06Q 10/08 |
| | | | 705/26.62 |
| 7,024,418 B1 | 4/2006 | Childress | |
| 7,050,982 B2 | 5/2006 | Sheinson et al. | |
| 7,069,118 B2 | 6/2006 | Coletrane et al. | |
| 7,092,898 B1 | 8/2006 | Mattick et al. | |
| 7,113,853 B2 | 9/2006 | Hecklinger | |
| 7,130,821 B1 | 10/2006 | Connors et al. | |
| 7,181,427 B1 | 2/2007 | DeFrancesco | |
| 7,184,974 B2 | 2/2007 | Shishido | |
| 7,191,058 B2 | 3/2007 | Laird et al. | |
| 7,228,298 B1 | 6/2007 | Raines | |
| 7,288,298 B2 | 6/2007 | Raines | |
| 7,275,083 B1 | 9/2007 | Seibel et al. | |
| 7,366,694 B2 | 4/2008 | Lazerson | |
| 7,392,203 B2 | 6/2008 | Edison et al. | |
| 7,392,221 B2 | 6/2008 | Nabe et al. | |
| 7,418,408 B1 * | 8/2008 | Heppe | G06Q 30/0639 |
| | | | 705/26.3 |
| 7,421,322 B1 | 9/2008 | Silversmith et al. | |
| 7,433,891 B2 | 10/2008 | Haber et al. | |
| 7,444,302 B2 | 10/2008 | Hu et al. | |
| 7,472,088 B2 | 12/2008 | Taylor et al. | |
| RE40,692 E | 3/2009 | Rose, Jr. | |
| 7,505,838 B2 | 3/2009 | Raines et al. | |
| 7,561,963 B2 | 7/2009 | Brice et al. | |
| 7,567,922 B1 | 7/2009 | Weinberg et al. | |
| 7,571,139 B1 | 8/2009 | Giordano et al. | |
| 7,580,856 B1 | 8/2009 | Pliha | |
| 7,590,589 B2 | 9/2009 | Hoffberg | |
| 7,593,893 B1 | 9/2009 | Ladd et al. | |
| 7,596,512 B1 | 9/2009 | Raines et al. | |
| 7,603,293 B2 | 10/2009 | Chenn | |
| 7,610,257 B1 | 10/2009 | Abrahams | |
| 7,630,932 B2 | 12/2009 | Danaher et al. | |
| 7,653,592 B1 | 1/2010 | Flaxman et al. | |
| 7,693,896 B1 | 4/2010 | Raines | |
| 7,739,142 B2 | 6/2010 | Chand et al. | |
| 7,778,841 B1 | 8/2010 | Bayer et al. | |
| 7,788,147 B2 | 8/2010 | Haggerty et al. | |
| 7,835,940 B2 | 11/2010 | Kowalchuk | |
| 7,865,409 B1 | 1/2011 | Monaghan | |
| 7,877,320 B1 | 1/2011 | Downey | |
| 7,925,654 B1 | 4/2011 | Raines | |
| 7,945,478 B2 | 5/2011 | Hogan et al. | |
| 7,945,483 B2 * | 5/2011 | Inghelbrecht | G06Q 30/0605 |
| | | | 705/26.1 |
| 7,962,404 B1 | 6/2011 | Metzger, II et al. | |
| 7,966,210 B2 | 6/2011 | Hall et al. | |
| 7,974,886 B2 | 7/2011 | Coleman | |
| 7,991,689 B1 | 8/2011 | Brunzell et al. | |
| 8,005,759 B2 * | 8/2011 | Hirtenstein | G06Q 30/0283 |
| | | | 705/306 |
| 8,005,795 B2 | 8/2011 | Galipeau et al. | |
| 8,036,952 B2 | 10/2011 | Mohr et al. | |
| 8,055,544 B2 | 11/2011 | Ullman et al. | |
| 8,078,524 B2 | 12/2011 | Crawford et al. | |
| 8,104,671 B2 | 1/2012 | Besecker et al. | |
| 8,121,938 B2 | 2/2012 | Zettner et al. | |
| 8,185,417 B1 | 5/2012 | Brown et al. | |
| 8,219,464 B2 * | 7/2012 | Inghelbrecht | G06Q 30/0207 |
| | | | 705/27.1 |
| 8,239,388 B2 | 8/2012 | Raines | |
| 8,244,563 B2 | 8/2012 | Coon et al. | |
| 8,255,243 B2 | 8/2012 | Raines et al. | |
| 8,255,244 B2 | 8/2012 | Raines et al. | |
| 8,285,656 B1 | 10/2012 | Chang et al. | |
| 8,355,983 B1 | 1/2013 | Parr et al. | |
| 8,380,594 B2 | 2/2013 | Berkman et al. | |
| 8,392,334 B2 | 3/2013 | Hirtenstein et al. | |
| 8,438,048 B1 * | 5/2013 | Benavides, III | G06Q 40/08 |
| | | | 705/4 |
| 8,438,170 B2 | 5/2013 | Koran et al. | |
| 8,521,615 B2 * | 8/2013 | Inghelbrecht | G06Q 30/0601 |
| | | | 705/27.1 |
| 8,560,161 B1 | 10/2013 | Kator et al. | |
| 8,577,736 B2 * | 11/2013 | Swinson | G06Q 30/0278 |
| | | | 705/26.1 |
| 8,595,079 B1 | 11/2013 | Raines et al. | |
| 8,600,783 B2 | 12/2013 | Smith et al. | |
| 8,600,823 B1 | 12/2013 | Raines et al. | |
| 8,606,648 B1 | 12/2013 | Bayer et al. | |
| 8,626,560 B1 | 1/2014 | Anderson | |
| 8,630,929 B2 | 1/2014 | Haggerty et al. | |
| 8,645,193 B2 * | 2/2014 | Swinson | G06Q 10/06 |
| | | | 705/7.35 |
| 8,661,032 B2 | 2/2014 | Otten et al. | |
| 8,725,584 B1 | 5/2014 | Eager et al. | |
| 8,781,846 B2 * | 7/2014 | Swinson | G06Q 30/0206 |
| | | | 705/1.1 |
| 9,020,843 B2 * | 4/2015 | Taira | G06Q 30/0278 |
| | | | 705/27.1 |
| 9,020,844 B2 * | 4/2015 | Taira | G06Q 30/0207 |
| | | | 705/27.1 |
| 9,053,589 B1 | 6/2015 | Kator et al. | |
| 9,053,590 B1 | 6/2015 | Kator et al. | |
| 9,076,276 B1 | 7/2015 | Kator et al. | |
| 9,087,335 B2 | 7/2015 | Rane et al. | |
| 9,105,048 B2 | 8/2015 | Koran et al. | |
| 9,111,308 B2 * | 8/2015 | Taira | G06Q 30/0205 |
| 9,123,056 B2 | 9/2015 | Singh et al. | |
| 9,129,325 B2 * | 9/2015 | Taira | G06Q 30/0621 |
| 9,147,217 B1 | 9/2015 | Zabritski et al. | |
| 9,292,860 B2 | 3/2016 | Singh et al. | |
| 9,501,781 B2 | 11/2016 | Singh et al. | |
| 9,646,308 B1 | 5/2017 | Eager et al. | |
| 9,690,820 B1 | 6/2017 | Girulat, Jr. | |
| 9,697,544 B1 | 7/2017 | Bayer et al. | |
| 9,727,904 B2 * | 8/2017 | Inghelbrecht | G06Q 30/0611 |
| 9,741,066 B2 | 8/2017 | Eager et al. | |
| 9,754,304 B2 * | 9/2017 | Taira | G06Q 30/0207 |

(56) References Cited

U.S. PATENT DOCUMENTS

| | | | |
|---|---|---|---|
| 9,818,140 B2* | 11/2017 | Inghelbrecht | G06Q 30/0623 |
| 9,904,933 B2* | 2/2018 | Taira | G06Q 30/0283 |
| 9,904,948 B2* | 2/2018 | Taira | G06Q 30/0206 |
| 10,162,848 B2 | 12/2018 | Mohan et al. | |
| 10,163,156 B1 | 12/2018 | Shapley et al. | |
| 10,217,123 B2* | 2/2019 | Taira | G06Q 30/0278 |
| 10,269,030 B2* | 4/2019 | Taira | G06Q 30/0278 |
| 10,269,031 B2* | 4/2019 | Inghelbrecht | G06Q 40/12 |
| 10,380,654 B2 | 8/2019 | Hirtenstein et al. | |
| 10,409,867 B1 | 9/2019 | Von Busch et al. | |
| 10,430,848 B2 | 10/2019 | Cotton et al. | |
| 10,489,809 B2* | 11/2019 | Inghelbrecht | G06Q 30/0205 |
| 10,489,810 B2* | 11/2019 | Taira | G06Q 30/02 |
| 10,515,382 B2* | 12/2019 | Taira | G06Q 30/0611 |
| 10,565,181 B1 | 2/2020 | Hjermstad et al. | |
| 10,580,054 B2 | 3/2020 | Cain et al. | |
| 10,581,825 B2 | 3/2020 | Poschel et al. | |
| 10,740,404 B1 | 8/2020 | Hjermstad et al. | |
| 10,853,831 B2 | 12/2020 | Inghelbrecht et al. | |
| 10,977,727 B1 | 4/2021 | Smith et al. | |
| 11,157,835 B1 | 10/2021 | Hjermstad et al. | |
| 11,176,608 B1 | 11/2021 | Smith | |
| 2001/0044769 A1 | 11/2001 | Chaves | |
| 2002/0023051 A1 | 2/2002 | Kunzle et al. | |
| 2002/0042752 A1 | 4/2002 | Chaves | |
| 2002/0072964 A1 | 6/2002 | Choi | |
| 2002/0082978 A1 | 6/2002 | Ghouri et al. | |
| 2002/0091706 A1 | 7/2002 | Anderson et al. | |
| 2002/0099628 A1 | 7/2002 | Takaoka et al. | |
| 2002/0103622 A1 | 8/2002 | Burge | |
| 2002/0128960 A1 | 9/2002 | Lambiotte et al. | |
| 2002/0161496 A1 | 10/2002 | Yamaki | |
| 2002/0193925 A1 | 12/2002 | Funkhouser et al. | |
| 2003/0033242 A1 | 2/2003 | Lynch et al. | |
| 2003/0041019 A1 | 2/2003 | Vagim, III et al. | |
| 2003/0046179 A1 | 3/2003 | Anabtawi et al. | |
| 2003/0101111 A1 | 5/2003 | Dang et al. | |
| 2003/0105728 A1 | 6/2003 | Yano et al. | |
| 2003/0144950 A1 | 7/2003 | O'Brien et al. | |
| 2003/0177481 A1 | 9/2003 | Amaru et al. | |
| 2003/0187753 A1 | 10/2003 | Takaoka | |
| 2003/0200151 A1 | 10/2003 | Ellenson et al. | |
| 2003/0216965 A1 | 11/2003 | Libman | |
| 2003/0233323 A1 | 12/2003 | Bilski et al. | |
| 2004/0034657 A1 | 2/2004 | Zambo et al. | |
| 2004/0039646 A1* | 2/2004 | Hacker | G06Q 10/087 705/22 |
| 2004/0088228 A1* | 5/2004 | Mercer | G06Q 10/08 705/28 |
| 2004/0107125 A1 | 6/2004 | Guheen et al. | |
| 2004/0128262 A1 | 7/2004 | Nafousi | |
| 2004/0163101 A1 | 8/2004 | Swix | |
| 2004/0193644 A1 | 9/2004 | Baker et al. | |
| 2004/0243506 A1 | 12/2004 | Das | |
| 2004/0249532 A1 | 12/2004 | Kelly et al. | |
| 2005/0010555 A1 | 1/2005 | Gallivan | |
| 2005/0021384 A1 | 1/2005 | Pantaleo et al. | |
| 2005/0038580 A1 | 2/2005 | Seim et al. | |
| 2005/0113991 A1 | 5/2005 | Rogers et al. | |
| 2005/0173524 A1* | 8/2005 | Schrader | G08G 1/052 235/384 |
| 2005/0177489 A1 | 8/2005 | Neff et al. | |
| 2005/0209892 A1 | 9/2005 | Miller | |
| 2005/0234912 A1* | 10/2005 | Roach | G06Q 30/02 |
| 2005/0246256 A1 | 11/2005 | Gastineau et al. | |
| 2005/0251820 A1 | 11/2005 | Stefanik et al. | |
| 2005/0256780 A1 | 11/2005 | Eldred | |
| 2005/0267754 A1 | 12/2005 | Schultz et al. | |
| 2005/0267774 A1* | 12/2005 | Merritt | G06Q 30/06 705/306 |
| 2006/0004731 A1 | 1/2006 | Seibel et al. | |
| 2006/0010052 A1 | 1/2006 | Willingham | |
| 2006/0015425 A1 | 1/2006 | Brooks | |
| 2006/0031182 A1 | 2/2006 | Ryan et al. | |
| 2006/0041443 A1 | 2/2006 | Horvath | |
| 2006/0107560 A1 | 5/2006 | Wong | |
| 2006/0149674 A1 | 7/2006 | Cook et al. | |
| 2006/0163868 A1 | 7/2006 | Baumann | |
| 2006/0178957 A1 | 8/2006 | LeClaire | |
| 2006/0178973 A1 | 8/2006 | Chiovari et al. | |
| 2006/0202012 A1 | 9/2006 | Grano et al. | |
| 2006/0202862 A1* | 9/2006 | Ratnakar | G08G 1/017 340/933 |
| 2006/0206416 A1 | 9/2006 | Farias | |
| 2006/0218079 A1 | 9/2006 | Goldblatt et al. | |
| 2006/0229799 A1 | 10/2006 | Nimmo et al. | |
| 2006/0242039 A1 | 10/2006 | Haggerty et al. | |
| 2006/0242046 A1 | 10/2006 | Haggerty et al. | |
| 2006/0242050 A1 | 10/2006 | Haggerty et al. | |
| 2006/0277141 A1 | 12/2006 | Palmer | |
| 2007/0011083 A1 | 1/2007 | Bird et al. | |
| 2007/0027791 A1 | 2/2007 | Young et al. | |
| 2007/0043487 A1 | 2/2007 | Krzystofczyk et al. | |
| 2007/0059442 A1 | 3/2007 | Sabeta | |
| 2007/0136163 A1 | 6/2007 | Bell | |
| 2007/0156515 A1 | 7/2007 | Hasselback et al. | |
| 2007/0162293 A1* | 7/2007 | Malkon | G06Q 99/00 705/306 |
| 2007/0173993 A1 | 7/2007 | Nielsen et al. | |
| 2007/0179798 A1 | 8/2007 | Inbarajan | |
| 2007/0179860 A1 | 8/2007 | Romero | |
| 2007/0185777 A1 | 8/2007 | Pyle et al. | |
| 2007/0192165 A1 | 8/2007 | Haggerty et al. | |
| 2007/0226131 A1 | 9/2007 | Decker et al. | |
| 2007/0244732 A1 | 10/2007 | Chatterji et al. | |
| 2007/0250327 A1* | 10/2007 | Hedy | G06Q 30/0278 705/306 |
| 2007/0271178 A1 | 11/2007 | Davis et al. | |
| 2007/0282713 A1 | 12/2007 | Ullman et al. | |
| 2007/0288271 A1 | 12/2007 | Klinkhammer | |
| 2007/0294163 A1 | 12/2007 | Harmon et al. | |
| 2008/0015954 A1 | 1/2008 | Huber et al. | |
| 2008/0016119 A1 | 1/2008 | Sharma et al. | |
| 2008/0059317 A1 | 3/2008 | Chandran et al. | |
| 2008/0071882 A1 | 3/2008 | Hering et al. | |
| 2008/0097663 A1 | 4/2008 | Morimoto | |
| 2008/0120155 A1 | 5/2008 | Pliha | |
| 2008/0126137 A1 | 5/2008 | Kidd et al. | |
| 2008/0177590 A1 | 7/2008 | Brodsky et al. | |
| 2008/0183689 A1 | 7/2008 | Kubota et al. | |
| 2008/0183722 A1* | 7/2008 | Lane | G07C 9/28 |
| 2008/0201163 A1 | 8/2008 | Barker et al. | |
| 2008/0228635 A1 | 9/2008 | Megdal et al. | |
| 2008/0235061 A1 | 9/2008 | Innes | |
| 2008/0255897 A1 | 10/2008 | Megdal et al. | |
| 2008/0294540 A1 | 11/2008 | Celka et al. | |
| 2008/0294546 A1 | 11/2008 | Flannery | |
| 2008/0301188 A1 | 12/2008 | O'Hara | |
| 2008/0312969 A1 | 12/2008 | Raines et al. | |
| 2009/0018996 A1 | 1/2009 | Hunt et al. | |
| 2009/0055044 A1 | 2/2009 | Dienst | |
| 2009/0063172 A1* | 3/2009 | Thomas | G06Q 30/014 705/303 |
| 2009/0083130 A1 | 3/2009 | Hall et al. | |
| 2009/0138290 A1 | 5/2009 | Holden | |
| 2009/0144201 A1 | 6/2009 | Gierkink et al. | |
| 2009/0187513 A1 | 7/2009 | Noy et al. | |
| 2009/0240602 A1* | 9/2009 | Mohr | G06Q 10/00 705/26.1 |
| 2009/0240735 A1 | 9/2009 | Grandhi et al. | |
| 2009/0271296 A1 | 10/2009 | Romero | |
| 2009/0271385 A1 | 10/2009 | Krishnamoorthy et al. | |
| 2009/0287370 A1 | 11/2009 | Iwai et al. | |
| 2010/0030649 A1 | 2/2010 | Ubelhor | |
| 2010/0049538 A1 | 2/2010 | Frazer et al. | |
| 2010/0070343 A1 | 3/2010 | Taira et al. | |
| 2010/0070382 A1 | 3/2010 | Inghelbrecht et al. | |
| 2010/0076881 A1 | 3/2010 | O'Grady et al. | |
| 2010/0082792 A1 | 4/2010 | Johnson | |
| 2010/0088158 A1 | 4/2010 | Pollack | |
| 2010/0094664 A1 | 4/2010 | Bush et al. | |
| 2010/0153235 A1* | 6/2010 | Mohr | G06Q 30/0601 705/26.1 |
| 2010/0161486 A1 | 6/2010 | Liu et al. | |

(56) References Cited

U.S. PATENT DOCUMENTS

| | | | |
|---|---|---|---|
| 2010/0174657 A1* | 7/2010 | Stanton, Jr. | G06Q 30/0278 705/306 |
| 2010/0179861 A1 | 7/2010 | Teerilahti et al. | |
| 2010/0198629 A1 | 8/2010 | Wesileder et al. | |
| 2010/0217616 A1 | 8/2010 | Colson et al. | |
| 2010/0223106 A1 | 9/2010 | Hallowell et al. | |
| 2010/0293089 A1 | 11/2010 | Peterson et al. | |
| 2010/0293181 A1 | 11/2010 | Muller et al. | |
| 2010/0299190 A1* | 11/2010 | Pratt | G06Q 30/0282 705/14.4 |
| 2010/0332292 A1 | 12/2010 | Anderson | |
| 2011/0022489 A1 | 1/2011 | Hallowell et al. | |
| 2011/0022525 A1* | 1/2011 | Swinson | G06Q 30/0278 705/306 |
| 2011/0040440 A1 | 2/2011 | de Oliveira et al. | |
| 2011/0082759 A1 | 4/2011 | Swinson et al. | |
| 2011/0137758 A1 | 6/2011 | Bienias | |
| 2011/0161115 A1 | 6/2011 | Hampton | |
| 2011/0202471 A1 | 8/2011 | Scott et al. | |
| 2011/0213641 A1 | 9/2011 | Metzger, II et al. | |
| 2011/0264595 A1* | 10/2011 | Anspach | G06Q 30/0629 705/306 |
| 2011/0270706 A1 | 11/2011 | Anspach et al. | |
| 2011/0270707 A1 | 11/2011 | Breed et al. | |
| 2011/0276467 A1 | 11/2011 | Blackburn et al. | |
| 2011/0320241 A1 | 12/2011 | Miller | |
| 2012/0005045 A1 | 1/2012 | Baker | |
| 2012/0005108 A1 | 1/2012 | Hollenshead et al. | |
| 2012/0106801 A1 | 5/2012 | Jackson | |
| 2012/0109770 A1 | 5/2012 | Seergy et al. | |
| 2012/0197699 A1 | 8/2012 | Snell et al. | |
| 2012/0221485 A1 | 8/2012 | Leidner et al. | |
| 2012/0239637 A9 | 9/2012 | Prakash et al. | |
| 2012/0254017 A1 | 10/2012 | Fusco et al. | |
| 2012/0265648 A1 | 10/2012 | Jerome et al. | |
| 2012/0271850 A1 | 10/2012 | Licata Messana et al. | |
| 2012/0331010 A1 | 12/2012 | Christie | |
| 2013/0006801 A1 | 1/2013 | Solari et al. | |
| 2013/0006809 A1 | 1/2013 | Hollenshead et al. | |
| 2013/0159033 A1 | 6/2013 | Weinstock et al. | |
| 2013/0173453 A1 | 7/2013 | Raines et al. | |
| 2013/0238455 A1 | 9/2013 | Laracey | |
| 2013/0268298 A1 | 10/2013 | Elkins et al. | |
| 2014/0025681 A1 | 1/2014 | Raines | |
| 2014/0058956 A1 | 2/2014 | Raines et al. | |
| 2014/0082017 A1 | 3/2014 | Miller | |
| 2014/0258309 A1 | 9/2014 | Young | |
| 2014/0358719 A1* | 12/2014 | Inghelbrect | G06Q 30/0601 705/26.5 |
| 2015/0154608 A9 | 6/2015 | Raines | |
| 2015/0213559 A1 | 7/2015 | Raines et al. | |
| 2015/0227942 A1 | 8/2015 | Sidman et al. | |
| 2015/0310865 A1 | 10/2015 | Fay et al. | |
| 2015/0317728 A1 | 11/2015 | Nguyen | |
| 2015/0324400 A1 | 11/2015 | Sheck et al. | |
| 2015/0332411 A1 | 11/2015 | Bush et al. | |
| 2015/0348143 A1 | 12/2015 | Raines et al. | |
| 2015/0348145 A1 | 12/2015 | Nakajima | |
| 2016/0004742 A1 | 1/2016 | Mohan et al. | |
| 2016/0012494 A1 | 1/2016 | Lasini | |
| 2016/0217046 A1 | 7/2016 | Lamoureux et al. | |
| 2016/0267588 A1 | 9/2016 | Cain et al. | |
| 2016/0299905 A1 | 10/2016 | Geyer et al. | |
| 2016/0321726 A1 | 11/2016 | Singh et al. | |
| 2016/0379486 A1 | 12/2016 | Taylor | |
| 2017/0052652 A1 | 2/2017 | Denton et al. | |
| 2017/0270490 A1 | 9/2017 | Penilla et al. | |
| 2017/0323295 A1 | 11/2017 | Kranzley et al. | |
| 2018/0018723 A1 | 1/2018 | Nagla et al. | |
| 2018/0107676 A1 | 4/2018 | Vora | |
| 2018/0108189 A1 | 4/2018 | Park et al. | |
| 2018/0157761 A1 | 6/2018 | Halstead et al. | |
| 2018/0165747 A1 | 6/2018 | Patten et al. | |
| 2018/0349988 A1 | 12/2018 | Shebesta et al. | |
| 2019/0295133 A1 | 9/2019 | Hirtenstein et al. | |
| 2020/0051102 A1* | 2/2020 | Taira | G06Q 10/067 |
| 2020/0065898 A1 | 2/2020 | Forrester et al. | |
| 2020/0265480 A1* | 8/2020 | Swinson | G06Q 30/0278 |

FOREIGN PATENT DOCUMENTS

| | | |
|---|---|---|
| JP | 09-251486 | 9/1997 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2007-299281 | 11/2007 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2002-0068866 | 8/2002 |
| WO | WO 99/004350 | 1/1999 |
| WO | WO 99/022328 | 5/1999 |
| WO | WO 01/071458 | 9/2001 |
| WO | WO 01/075754 | 10/2001 |
| WO | WO 03/101123 | 12/2003 |
| WO | WO 2007/149941 | 12/2007 |
| WO | WO 2008/022289 | 2/2008 |
| WO | WO 2018/199992 | 11/2018 |

OTHER PUBLICATIONS

U.S. Appl. No. 14/080,416, System and Method for Providing Comprehensive Vehicle Information, filed Nov. 14, 2013.

U.S. Appl. No. 16/114,931, Web-Based System and Method for Providing Comprehensive Vehicle Build Information, filed Aug. 28, 2018.

"Activant PartExpert with Vehicle Identification Number (VIN) Lookup", Activant Solutions, Inc., Livermore, CA, Copyright 2006, http://counterworks.com/PartExp_DS_092806.pdf, pp. 2.

"AutoConnect Partners with Organic to Build World's Most Comprehensive Online Emporium of Pre-Owned Vehicles", PR Newswire, May 19, 1998, pp. 2.

"Auto Market StatisticsSM:Drive Response with Aggregated Motor Vehicle Information", Experian, Apr. 2007, http://www.experian.com/assets/marketing-services/product-sheets/auto-market-statistics.pdf, pp. 2.

"Appraisal Tool", VAuto Live Market View, Dec. 14, 2007, http://www.vauto.com/vAuto_solution/appraisal.asp, pp. 3.

Autobytel.com, http://web.archive.org/web/20040806010507//http://autobytel.com/, as archived Aug. 6, 2004, pp. 3.

Bala, Pradip Kumar, "Purchase-Driven Classification for Improved Forecasting in Spare Parts Inventory Replenishment," International Journal of Computer Applications, Nov. 2010, vol. 10, No. 9, pp. 40-45.

Bankrate.com, http://web.archive.org/web/20040809000026/www.bankrate.com/brm/default.asp, as archived Aug. 9, 2004, pp. 3.

"Carfax Teams with Esurance", PR Newswire, May 14, 2001, p. 1.

Cars.com, http://web.archive.org/web/20041010081241/www.cars.com/go/index.jsp?aff=national, as archived Oct. 10, 2004, pp. 2.

Carsdirect.com, http://web.archive.org/web/20040730142836/www.carsdirect.com/home, as archived Jul. 30, 2004, pp. 2.

Checkbook.org, http://web.archive.org/web/20040604192834/www.checkbook.org/auto/carbarg.cfm, as archived Jun. 4, 2004, p. 1.

"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.

(56) References Cited

OTHER PUBLICATIONS

Cohen et al., "Optimizer: IBM's Multi Echelon Inventory System for Managing Service Logistics", Interfaces, vol. 20, No. 1, Jan.-Feb. 1990, pp. 65-82.
Copeland et al., "Wallet-on-Wheels—Using Vehicle's Identity for Secure Mobile Money", 17th International Conference on Intelligence in Next Generation Networks, 2013, pp. 102-109.
"Driveitaway.com Links with AutoCheck to Provide Car Shoppers Vehicle Histories; Consumers Bidding on Driveitaway.com's Used Auto Auctions Can Now Go Online to Research a Specific Vehicle's History", PR Newswire, Jan. 15, 2001, p. 1.
"Experian Uses SSA-NAME3 to Match 40 to 50 Million Transactions per Month Against an 11.5 Billion Row Database", DM Review, Apr. 2001, vol. 11, No. 4, pp. 3.
Farrell et al., "Installed Base and Compatibility: Innovation, Product Preannouncements, and Predation", The American Economic Review, Dec. 1986, vol. 76, No. 5, pp. 940-955.
Garcia-Molina et al., "Database Systems: The Complete Book", Prentice Hall, Inc., Ch. 15, 2002, pp. 713-715.
Grange, Frank, "Challenges in Modeling Demand for Inventory Optimization of Slow-Moving Items," Proceedings of the 1998 Winter Simulation Conference, 1998, pp. 1211-1217.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield et al., "Managing Component Life Cycles in Dynamic Technological Environments", International Journal of Purchasing and Materials Management, Tempe, Spring 1994, vol. 30, No. 2, pp. 20-28.
Inderfurth et al., "Decision Support for Spare Parts Acquisition in Post Product Life Cycle", Central European Journal of Operations Research, 2008, vol. 16, pp. 17-42.
"Intelligence Insight Impact", Polk Automotive Manufacturers; http://usa.polk.com/Industries/AutoMfr/Analyze/MarketAnalysis/, Dec. 13, 2007, pp. 3.
Invoicedealers.com, http://web.archive.org/web/20040804044511/ http://www.invoicedealers.com/, Aug. 4, 2004, pp. 2.
Ivillage.com, http://web.archive.org/web/20040729234947/http:// www.ivillage.com/, Jul. 29, 2004, pp. 2.
"Japan's JAAI System Appraises Used Cars Over Internet", Asia Pulse, Mar. 3, 2000, p. 1.
Jaro, Matthew A., "Probabilistic Linkage of Large Public Health Data Files", Statistics in Medicine, 1995, vol. 14, pp. 491-498.
Käki, Anssi, "Forecasting in End-Of-Life Spare Parts Procurement", Master's Thesis, Helsinki University of Technology, System Analysis Laboratory, Jul. 27, 2007, pp. 84.
Kennedy et al., "An Overview of Recent Literature on Spare Parts Inventories", International Journal of Production Economics, 2002, vol. 76, pp. 201-215.
Kim et al., "Optimal Pricing, EOL (End of Life) Warranty, and Spare Parts Manufacturing Strategy Amid Product Transition", European Journal of Operation Research, 2008, vol. 188, pp. 723-745.
Koller, Mike, "Wireless Service Aids," InternetWeek, Jul. 9, 2001, p. 15.
Krupp, James A.G., "Forecasting for the Automotive Aftermarket", The Journal of Business Forecasting Methods & Systems, Winter 1993-1994, vol. 12, No. 4, ABI/Inform Global, pp. 8-12.
Lapide, Larry, "New Developments in Business Forecasting", The Journal of Business Forecasting, Spring 2002, pp. 12-14.
Lee, Ho Geun, "AUCNET: Electronic Intermediary for Used-Car Transactions", EM—Electronic Markets, Dec. 1997, vol. 7, No. 4, pp. 24-28.
Miller, Joe, "NADA Used-Car Prices Go Online", Automotive News, Jun. 14, 1999, p. 36.
Moore, John R., Jr. "Forecasting and Scheduling for Past-Model Replacement Parts", Management Science, Application Series, vol. 18, No. 4, Part 1, Dec. 1971, pp. B-200-B-213.
"NAAA—Recommended Vehicle Condition Grading Scale", Noted as early as 2007, pp. 3.
Packer, A. H., "Simulation and Adaptive Forecasting an Applied to Inventory Control", Operations Research, Jul. 1965, vol. 15, No. 4, pp. 660-679.
"Power Information Network: Power to Drive your Business", J.D. Power and Associates Power Information Network, http://www. powerinfonet.com/products/productDetail.asp?type=financialinstitutions, Dec. 13, 2007, pp. 2.
Peters, Peter-Paul, "A Spare Parts Configurator for the European Service Business" (Graduation Report), Honeywell, Industrial Service Logistic Center, Amsterdam, The Netherlands, Mar. 2000, pp. 80.
Porter, G. Zell, "An Economic Method for Evaluating Electronic Component Obsolescence Solutions", www.gidep.org/data/dmsms/ library/zell.pdf, May 1998, pp. 1-9.
"Pricing Tool", vAuto Live Market View, http://www.avauto.com/ vAuto_Solution/pricing.asp, Dec. 13, 2007, pp. 2.
Reinbach, Andrew, "MCIF Aids Banks in CRA Compliance", Bank Systems & Technology, Aug. 1995, vol. 32, No. 8, p. 27.
Roos, Gina, "Web-Based Service Helps OEMs Cure Parts Obsolescence Blues", Electronic Engineering Times, Oct. 8, 2001, p. 86.
Santarini, Michael, "Forecasts the Probable Obsolescence of Components—Module Predicts Parts Life", Electronic Engineering Times, Jan. 11, 1999, vol. 1, p. 48.
Sawyers, Arlena, "NADA to Offer Residual Guide", Automotive News, May 22, 2000, p. 1.
Shapiro et al., "Systems Competition and Aftermarkets: an Economic Analysis of Kodak", The Antitrust Bulletin, Spring 1994, pp. 135-162.
"Stoneage Corporation Announces Database of 250,000 Used Cars Posted to the Internet", PR Newswire, Feb. 24, 1998, p. 1.
Sullivan, Laurie, "Obsolete-Parts Program Thriving", EBN, Manhasset, NY, Jan. 21, 2002, Issue 1296, p. 26.
"Urban Science Launches Second Generation Lead Scoring Solution", Urban Science, Detroit, MI, Mar. 1, 2007, http://www. urbanscience.com/newsevents/pr_20070222.html, pp. 3.
"WashingtonPost.com and Cars.com Launch Comprehensive Automotive Web Site For the Washington Area", PR Newswire, Oct. 22, 1998. pp. 2.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/ PressReleases/2002_03_06.aspx.
Webster, Lee R., "Failure Rates & Life-Cycle Costs", Consulting-Specifying Engineer, Apr. 1998, vol. 23, No. 4, ABI/INFORM Global, p. 42.
"Web Sites Let Automotive Consumers Arm Themselves with Price Information", Orange County Register, Nov. 14, 1997, pp. 3.
"Yahoo! Autos Provides Enhanced Road Map for Researching, Buying and Selling Cars Online", PR Newswire, Oct. 13, 1998, pp. 2.
International Search Report and Written Opinion in PCT Application No. PCT/US07/76152 (EXP.126VPC), dated Mar. 20, 2009.
Greenlight.com Teams up With Credit Online to Expand Online Financing Options, Published in PR Newswire Association LLC; New York; Aug. 28, 2000 extracted from Dialog on Jun. 14, 2021, pp. 3.
"The Most Reliable Cars 2006", https://www.forbes.com/2006/04/ 20/reliable-vehicles-japanese_cx_dl_0424feat%20html?sh= 19b3172a48f3, Apr. 24, 2006, pp. 4.

* cited by examiner

SYSTEM AND METHOD FOR PROVIDING COMPREHENSIVE VEHICLE INFORMATION

CROSS-REFERENCE TO RELATED APPLICATIONS

This application is a continuation of U.S. patent application Ser. No. 14/080,416, pending, filed Nov. 14, 2013, which a continuation-in-part of U.S. patent application Ser. No. 13/297,438, pending, filed Nov. 16, 2011, which claims priority to U.S. Patent Application No. 61/415,207, filed Nov. 18, 2010, the entireties of which are herein incorporated by reference for all purposes.

BACKGROUND

Vehicles typically have an associated vehicle identification number (VIN). The VIN may provide basic information about the vehicle. This information is encoded into the VIN by the manufacturer of the vehicle. The information may include, for example, the country of origin, manufacturer, year of manufacture, manufacturing assembly plant, make and model, etc., but may not include information regarding the trim details and/or any options/upgrades related to the vehicle. As a result, entities, such as dealers, banks, customers, insurance companies, auction houses, government entities, etc., have to visually verify certain vehicle features, such as trim levels, transmission, optional packages, and/or other equipment for the vehicle, to make an accurate identification and/or appraisal of the vehicle. Such visual verification may be quite difficult or even impossible to do in cases. For example, the vehicle may be in another location distant from the party that is to inspect the vehicle. Moreover, the party may not know exactly what to look for or may not be being willing to spend the time to examine the appropriate portions of the vehicle. In some cases, these entities end up asking another party for the information, or otherwise proceed without getting the additional information regarding the vehicle.

Often manufacturers offer vehicles with packages such as "sport" or "convenience" and trim levels such as "touring" or "grand touring" that can equate to hundreds or even thousands of dollars in additional value relative to lesser offerings of the vehicles. Indeed, these packages, trim levels, etc. are often not designated on the vehicle and/or may not be coded in the VIN. In addition, details on the meaning of these package or trim level designators are often not readily ascertainable without vendor specific knowledge or visual inspection. Hence, these vehicle details are not readily ascertainable based on the VIN or even vehicle inspection. This results in misrepresentations or errors in determining values for certain vehicles. Such errors and/or misrepresentations can lead to added exposure, risk, liability, and lost revenue to parties involved, such as lenders, dealers, auction houses, sellers, buyers, government agencies, and/or any entity that derives business based on vehicle evaluation. In other words, loan approvals, loan terms, pricing and buying decisions, auction reserve pricing or description, insurance policy premiums, property/excise/other vehicle tax premiums, etc. are determined from a value of the vehicle, which relies to some extent on vehicle information not encoded in the VIN. Inaccurate vehicle descriptions in this regard leads to inaccurate vehicle valuation, and thus inaccurate loan approval/terms, pricing, insurance policy coverage, property tax computations, etc.

SUMMARY

The following presents a simplified summary of one or more aspects to provide a basic understanding thereof. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

According to an example, a system for determining additional vehicle data is provided. The system includes processing circuitry configured to execute a vehicle identifying component for obtaining a vehicle identifier related to a vehicle, a manufacturer data obtaining component for retrieving a plurality of manufacturer codes indicating a build level configuration of the vehicle based at least in part on the vehicle identifier, an additional data determining component for determining a list of vehicle options corresponding to the plurality of manufacturer codes, and a vehicle data outputting component for communicating the additional vehicle data representative of the list of vehicle options to an application.

In another example, a system for determining vehicle data for evaluating a vehicle is provided. The system includes processing circuitry configured to execute a vehicle identifier obtaining component for receiving a vehicle identifier of a vehicle, a vehicle data obtaining component for retrieving additional vehicle data regarding the vehicle indicating one or more codes related to a build level configuration of the vehicle from a vehicle information system based on the vehicle identifier, and a vehicle data/information outputting component for outputting vehicle data evaluated based at least in part on the vehicle identifier and the additional vehicle data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations may denote like elements.

DETAILED DESCRIPTION

Figure 1:
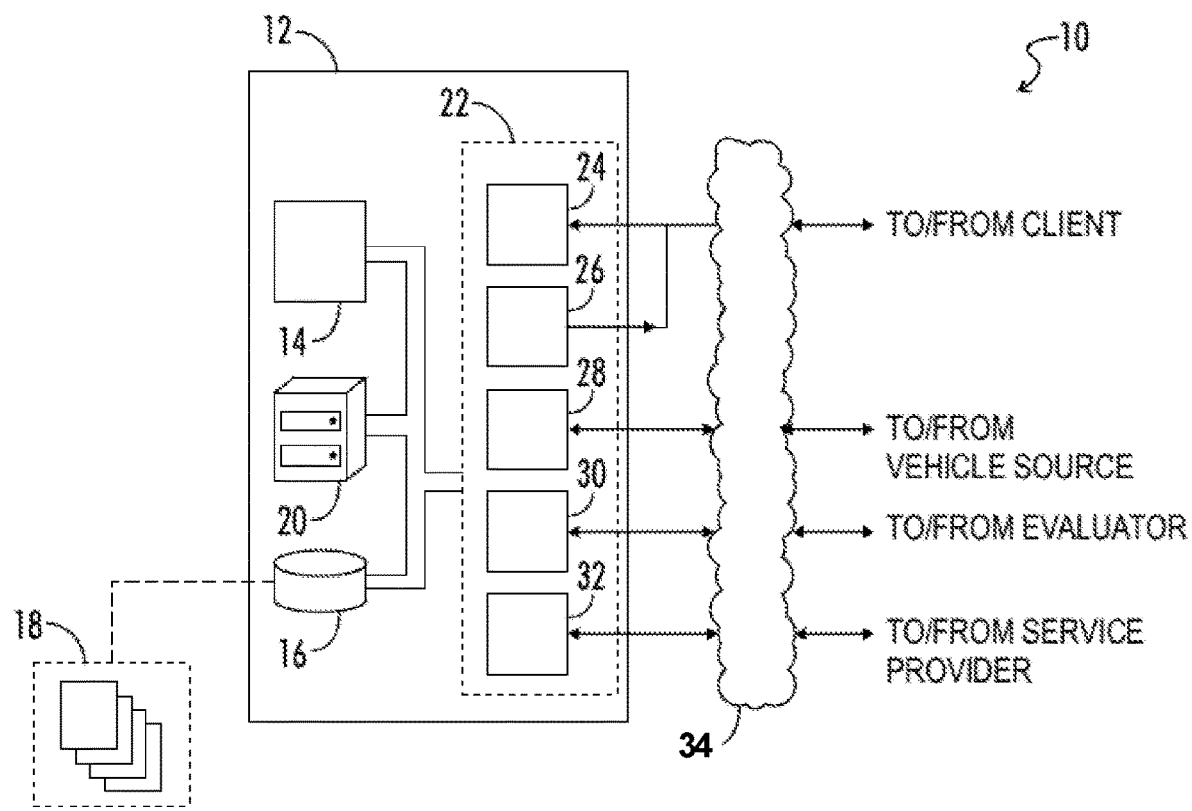
FIG. 1 is a block diagram representing an embodiment of a hosted system in accordance with aspect described herein.

Reference will now be made in detail to various aspects, one or more examples of which are illustrated in the accompanying drawings. Each example is provided by way of explanation, and not limitation of the aspects. In fact, it will be apparent to those skilled in the art that modifications and variations can be made in the described aspects without departing from the scope or spirit thereof. For instance, features illustrated or described as part of one example may be used on another example to yield a still further example. Thus, it is intended that the described aspects cover such modifications and variations as come within the scope of the appended claims and their equivalents.

Described herein are various aspects relating to associating additional vehicle data with a vehicle identifier in evaluating vehicles in various applications. For example, a vehicle identifier, such as a vehicle identification number (VIN), can be associated to a model code, a set of manufacturer codes, or other information received from a manufacturer of the vehicle. A set of options, trim level, or other information can be determined using the model code, manufacturer codes, etc. The set of options can be provided to an application for use in determining vehicle value, insurance policy premium, lien amounts, proper identification, etc. for the vehicle. In one example, the set of options determined based on model code, manufacturer code, etc. can be formatted for input to a particular application. For example, vehicle sales applications can use the additional information in obtaining vehicle value for determining an asking price, include the option information in a descriptive listing of the vehicle, and/or the like.

As used in this application, the terms "component," "module," "system," "device," "application" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, the subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it is to be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the subject matter.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Figure 2:
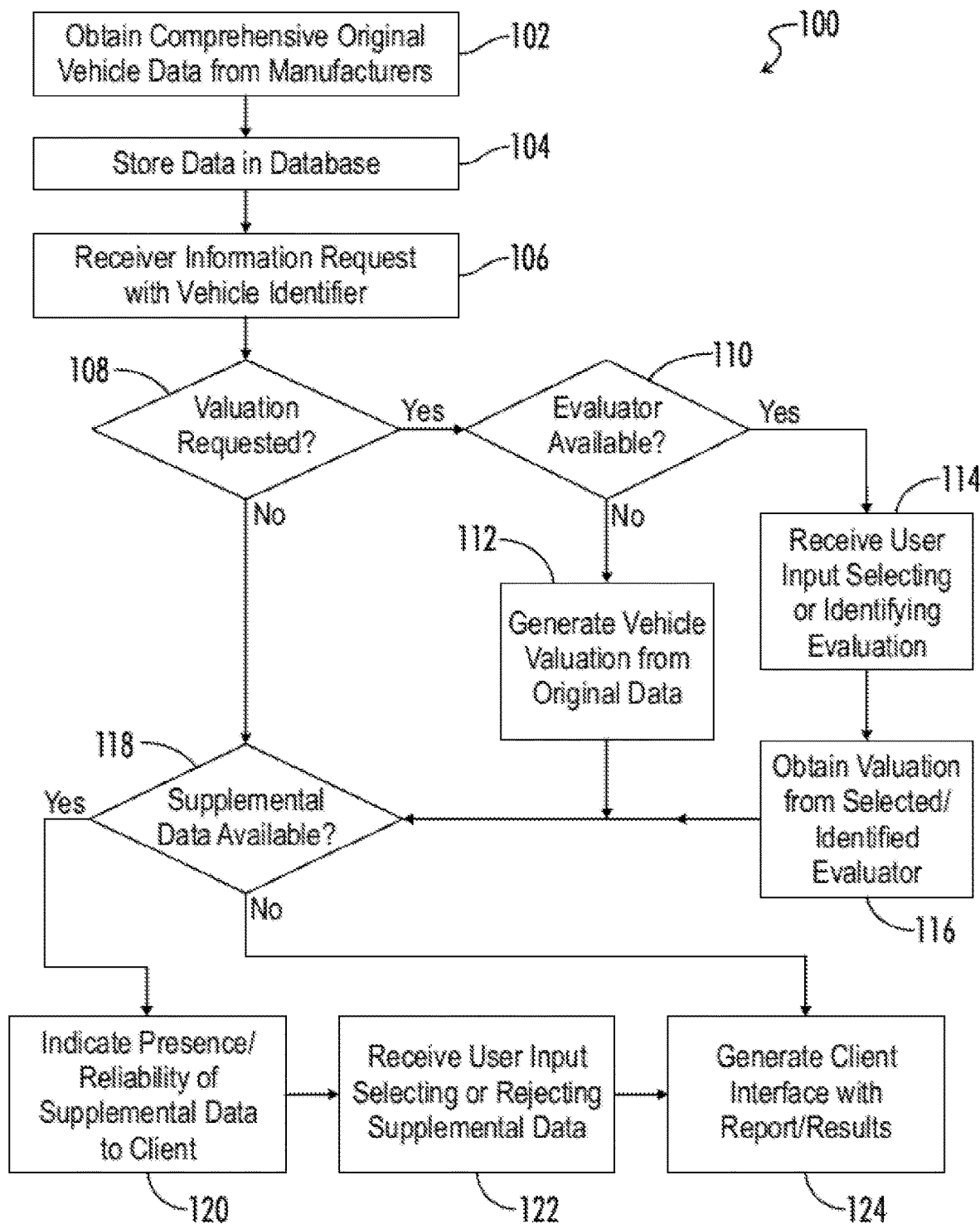
FIG. 2 is a flowchart representing an embodiment of a methodology in accordance with aspects described herein.

Referring generally to FIGS. 1 and 2, various embodiments are described herein for a system, non-transitory storage medium, and associated methods for providing comprehensive vehicle build data, trim and other detailed vehicle information such as optional equipment. Clients of a hosted system according to described aspects may obtain or otherwise view a report of verified vehicle information having been originally provided from the vehicle manufacturer, and in certain embodiments may further obtain a valuation for the vehicle as generated by a third party vehicle evaluator, and/or supplemental data from third party service providers having access to vehicle data downstream from the associated manufacturers.

Referring first to FIG. 1, an embodiment of a hosted system 10 may be described. The term "web-based system" as used herein may, unless otherwise stated, refer generally to a platform effective to implement web-transitory functions, whether browser-based or otherwise. In other embodiments, the host system may include other computer-based platforms such as for example peer-to-peer structures which may not be explicitly web-based.

The hosted system 10 is embodied by or within either of a central hosted server 12 or a plurality of servers 12 functionally linked and collectively defining a distributed host network (not shown). The server 12 as represented in FIG. 1 further includes a processor 14, a computer-readable memory medium 16, a database 20 and an I/O platform 22 which may typically include one or more user interfaces generated by program instructions or modules thereof in accordance with features, methods or steps described in greater detail below.

The term "processor" as used herein may refer to at least general purpose or specific-purpose processing devices and/or logic as may be understood by one of skill in the art, including but not limited to single- or multithreading processors, central processors, parent processors, graphical processors, media processors, and the like.

The host server 12 may be accessible by or otherwise linked to various external and third party platforms via a communications network 34 and in accordance with these links is effective to collect, obtain, receive, transmit and/or share data using various communications protocols as are well known in the art.

The term "computer-readable memory medium" as used herein may refer to any non-transitory medium 16 alone or as one of a plurality of nontransitory memory media 16 within which is embodied a computer program product 18 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor executable software, instructions or program modules residing on the media to be read and executed by a processor, including without limitation wire, cable, fiberoptic and wireless media such as is known in the art.

The term "communications network" 34 as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces as are known in the art.

The term "platform" as used herein may typically refer to a website, network, or alternative but equivalent interfaces for supporting multimedia interactivity consistent with the described features. The I/O platform 22 represented in FIG. 1 may typically refer to one or more websites including a plurality of web pages, pop-ups, links and the like, or alternatively email, text, or equivalent messaging platforms, which collectively define the plurality of user interfaces further described herein. Such interfaces as may be associated with or generated by the host system in accordance with described aspects may include without limitation a client request interface 24 for requesting vehicle information, a client response interface 26 for providing requested vehicle information, a vehicle source interface 28 for obtaining data from a vehicle manufacturer or other entity, a third party evaluator interface 30 for requesting and receiving vehicle valuations, and a vehicle service provider interface 32 for providing supplemental vehicle data for a given vehicle, as described further herein. It may be understood that the distinct interfaces as represented in FIG. 1 may be defined by or within a single website or even webpage having overlapping functionality, but this is by no means necessary within the scope of the present disclosure, and for example a "service provider" in one aspect may be a "vehicle source" or "client" in another aspect having access to the associated interfaces of the system.

A "client" as referred to herein may refer to any entity obtaining or seeking to obtain vehicle information utilizing the system and associated features, including without limitation lenders, dealers, auction offices, auto evaluators, insurance agencies, automobile websites, law enforcement agencies or officers, individual consumers, etc.

A "vehicle source" may typically refer to a vehicle manufacturer but may further refer to any entity providing verifiable and comprehensive original vehicle data in accordance with aspects described herein.

"Comprehensive original vehicle data" as used throughout this description (and also referred to herein as "original data") includes all vehicle data which is made available by the source and is relevant to the vehicle build data, trim, any optional detail information, vehicle valuation, etc., and generally includes information which is both coded and noncoded with respect to the vehicle identifier, and verifiable or non-verifiable by a user. Examples of such vehicle data may include standard information such as without limitation year, make and model of the vehicle. Other examples include factory information such as without limitation equipment, trim details, color, transmission details, drivetrain, factory packages, and factory options. Other examples include drivetrain information such as without limitation whether the vehicle is a four-wheel drive (4WD), a two-wheel drive (2WD, automatic 4WD, or allwheel Drive (AWD). The data is comprehensive in that it provides detailed information regarding vehicle build configuration, though the information may require resolving some coding to obtain a level of desired granularity. In addition, the data is original in that it is generated at or near the time the vehicle is built to include information regarding options, equipment, color, etc. as applied at the factory.

"Supplemental vehicle data" may include data such as current aftermarket replacements, upgrades, and the like with respect to a vehicle. Such data can be specified by vehicle service providers, as defined below, to indicate data beyond the comprehensive original vehicle data.

"Additional vehicle data" can refer to data beyond the VIN and data encoded in the VIN that can be discerned from the comprehensive original vehicle data. For example, additional vehicle data can include trim level, options, etc. that can be determined by mapping codes received in the comprehensive original vehicle data to one or more data sources that associated the codes with descriptive terms or other values associated with applications that utilize codes in assessing the vehicle.

A "vehicle service provider" may typically refer to any party that provides supplemental vehicle data. A service provider may be the manufacturer itself, or more typically may be a third party. Such third parties may in various embodiments be able to provide supplemental vehicle data, but this data may typically be separated from the original data and identified as being less reliable than data from the vehicle source, and even made optional for viewing by clients of the system, as further described below.

Referring now to FIG. 2, an exemplary method 100 may be described. It may be understood that the various steps recited herein are not limiting on the scope of the described subject matter unless otherwise stated, and that accordingly the steps are not required to be executed in the order provided or even at all unless otherwise stated or where logic dictates.

In step 102, a host server receives, collects, imports, or otherwise obtains comprehensive original vehicle data directly from a vehicle source (typically the respective manufacturer) to ensure the accuracy of the associated information. The data may be obtained periodically from the source, for example at predetermined intervals, or simply as determined by the source such as where new data has become available. Generally speaking, the vehicle data may be transmitted via the communications network to a dedicated interface (e.g., secured web page, email address, etc.) in the form of an electronic data file, but alternatively may be simply made available for collection from a database residing on a source platform by program modules operating from the host server or otherwise executed by the host system on or within the source platform.

Typically, the comprehensive original vehicle data will include or be provided in association with a unique vehicle identifier, such as for example a Vehicle Identification Number (VIN). In addition, the comprehensive original vehicle data can include data for determining at least some additional vehicle data (e.g., a set of options, drivetrain parameters, model, trim level, color, etc.) of a vehicle given the VIN.

The data may upon importation or collection by the host system then be stored in a database (step 104). In various embodiments, the original data may be raw data from the source which is converted by the host system into a universal format for storage in a collective database. The raw data may be obtained using a predetermined format which merely requires the host system to parse, collate, arrange, etc., the data in order to properly store it within the database. Alternatively, the host system may require the use of algorithms or equivalent programmed functions to identify or characterize the raw data prior to storage. In some embodiments, each source/manufacturer may send raw data in a unique format which is configured to facilitate population of an intended client interface that is particular to the source, such as for example including source-specific trademarks, etc.

In certain embodiments of a host system within the scope of aspects described herein, vehicle service providers such as for example authorized dealers and the like may be allowed to provide supplemental (aftermarket) data to the system via a service provider interface. Where for example a service provider has modified, upgraded or removed some component as originally provided with respect to a particular vehicle, supplemental data may be provided to the system along with the unique vehicle identifier and then stored in the database alongside the comprehensive original vehicle data. The supplemental data will typically be stored in auxiliary portions of the database and not for example over or in place of the original data.

The supplemental data may further be stored in association with a service provider identifier. The particular service provider may in an embodiment be associated by the host system with a reliability score or the equivalent, so as to indicate the likelihood that the information is correct and complete based on prior dealings and/or client comments/feedback, or as a potential reflection on the quality of the vehicle itself after having received aftermarket servicing from that particular service provider, again based on prior dealings and/or client feedback. Algorithms for scoring the service providers, or interfaces for client feedback and association thereof with the particular service providers, may be executed by the host system automatically upon receipt of supplemental data or via a trigger where for example the service provider has previously received negative feedback or otherwise scored below a threshold value.

The client-specific portion of the process (in other words the portion related to a specific transaction or client request) begins with step 106, wherein the host system receives a vehicle information request from a client via a dedicated interface (e.g., web page, pop-up data field, email address, etc.). The request can include a vehicle identifier associated with the vehicle for which information is sought, and additional vehicle data corresponding with the particular vehicle may be identified and retrieved from the database by matching the client-provided identifier with a unique identifier stored in association with the additional vehicle data. The vehicle identifier may be electronically scanned at the client end and submitted to the system interface, or alternatively manually entered via keystrokes and the like, equally within the scope of aspects described herein. Where the identifier is to be electronically scanned, the client-side hardware and associated software module necessary to generate the electronic identifier from (for example) the physical bar code is not itself generally associated with the host system and further description is omitted herein as redundant.

In certain embodiments, the system may generate a client response interface within or upon which is displayed at least a subset of the comprehensive original vehicle data for the identified vehicle (that which is associated with the vehicle identifier provided by the client), which may or may not include valuations or supplemental data. Such an embodiment may be used by an auction house, automobile website, or an equivalent client entity having no need of third party evaluations of the vehicle's value, or no desire to obtain potentially unreliable supplemental data from third party service providers. However, in other embodiments as are contemplated by a method 100 as represented in FIG. 2, such features may be at least optionally provided by the system, as further described below.

Where a client has requested a vehicle valuation from the system (i.e., "yes" in response to the query in step 108), it may further be determined whether an evaluator (e.g., a third party book evaluator) is available to provide valuation with respect to the identified vehicle (step 110). In some embodiments, this step may be redundant where the system is configured to provide all valuations internally and without the option of obtaining such valuations from an external source. In either event, where no evaluator is available or otherwise provided by the system for client selection (i.e., "no" in response to the query in step 110), the method 100 continues to step 112 and generates a vehicle valuation based on the comprehensive original vehicle data stored in the database. Program instructions or program modules which may be executed by the system to determine the value may include proprietary algorithms with respect to the host but are not so limited.

In some embodiments, the system may generate or determine a first vehicle valuation based on the original data and further determine a second vehicle valuation which is based on the original data and any available supplemental data, such that either may be displayed for the client based on client selection.

Where one or more evaluators are available and provided by the system (in for example a list) for client selection (i.e., "yes" in response to the query in step 110), the method 100 continues to step 114 and receives client input data representative of third party evaluator selection or identification. The system then obtains a vehicle valuation from the one or more evaluators selected or otherwise identified by the client (step 116).

Figure 3:
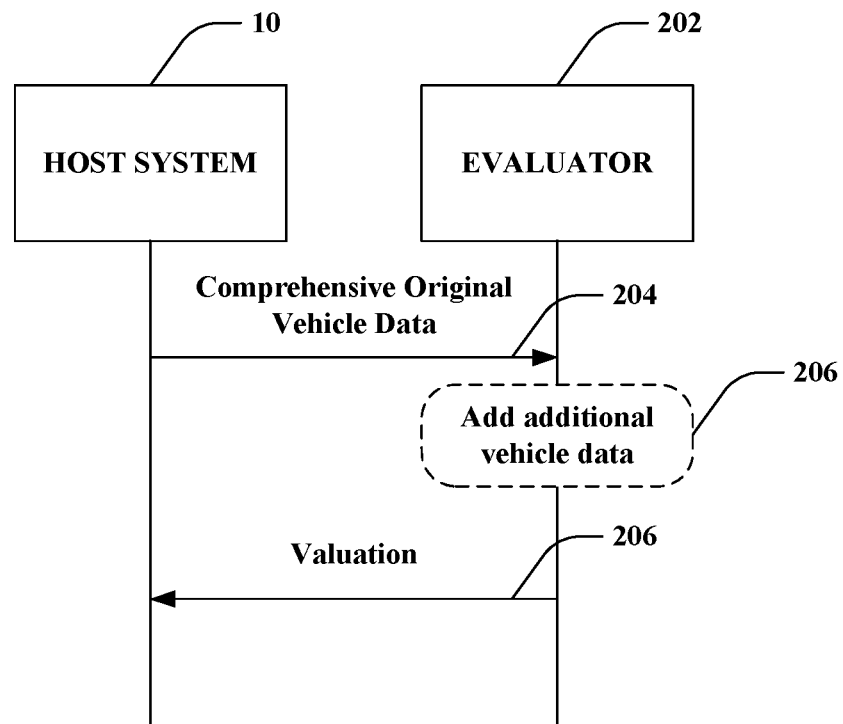
FIG. 3 is an aspect of an example host system and evaluator for communicating valuation data based on comprehensive original vehicle data.

As a first example of how the vehicle valuation may be obtained by the host system, as shown in FIG. 3, a data field may be generated which includes the comprehensive original vehicle data (and in some embodiments any supplemental data) and then transmitted to the selected one or more third party evaluators, such as evaluator 202, at 204. The vehicle identifier may in some cases be provided as well, but typically the vehicle data alone will be sufficient. The evaluator 202 may then populate the data field with any additional requested or required information, including vehicle valuation data, at 206. The vehicle valuation data may include a vehicle valuation and any other data which may be useful or available with respect to the particular evaluator, or as requested by the system 10. The vehicle valuation data may include for example a first vehicle valuation based on the original data received at 204 and a second vehicle valuation which is based on the original data received at 204 and any available additional or supplemental vehicle data determined at 206, such that either may be displayed for the client based on client selection.

In a second example, the data field is generated by the system 10 as described above. However, rather than transmitting the data field to the evaluator, the system 10 may generate and transmit a valuation request to the selected third parties via the dedicated interface (e.g., web page, email, direct download, etc.), with the request comprising at least a portion of the comprehensive original vehicle data as determined to be relevant for valuation by the particular evaluators at 204. The system 10 may then receive the requested vehicle valuation data from the third party evaluator 202 in any of a number of available formats, and subsequently populates the data field with a vehicle valuation based on the received vehicle valuation data, or otherwise stores the vehicle valuation data or a valuation derived therefrom in the database.

In a third example, the data field is generated as described above and then transmitted to the one or more selected/identified third party evaluators 202 at 204. Rather than return the data field to the host system 10 at 206, the evaluator 202 may simply provide the requested vehicle valuation data via for example an email or the like. The host system 10 receives the vehicle valuation data and then populates the data field with a vehicle valuation based on the received vehicle valuation data, or otherwise stores the valuation in the database in association with the original vehicle data.

The method 100 as represented in FIG. 2 may further in step 118 include determining whether or not supplemental data is available with respect to the identified vehicle (or whether the supplemental data feature is available in a given embodiment). If supplemental data is not available (for either reason), the method may proceed to step 124, and the system generates a client response interface which includes or otherwise displays some or all of the vehicle information results. The interface may not include all of the comprehensive vehicle information (which may be quite lengthy), but rather one or more subsets of the data in accordance with a predetermined template that is populated with the respective data. One or more templates may be provided for user selection in various embodiments, or for example a list of optional data sets may be provided to the user and a template created from a subsequent user selection. The interface may be a web page or part of a mobile device application, in which the results may be pushed out by the host system via the communications network and displayed, or for example an email having text results or an embedded electronic file with the results, or various alternative and equivalent interfaces as may be known to those of skill in the art.

If supplemental data is available (i.e., "yes" in response to the query of step 118), the method proceeds to step 120 and indicates to the client the presence of supplemental data associated with the identified vehicle. The system may further indicate the service provider that was the source of the supplemental data, and where supplemental data has been provided from more than one service provider, each provider may for example be listed. If the system is programmed or configured to determine a reliability score or otherwise collect feedback regarding the various service providers, such information may be provided as well for review by the client.

In step 122, the client may then provide input to the system representative of selection or rejection of one or more of the service providers and associated supplemental data for inclusion in the final report or displayed results, wherein the method 100 proceeds to step 124 as described above.

Figure 4:
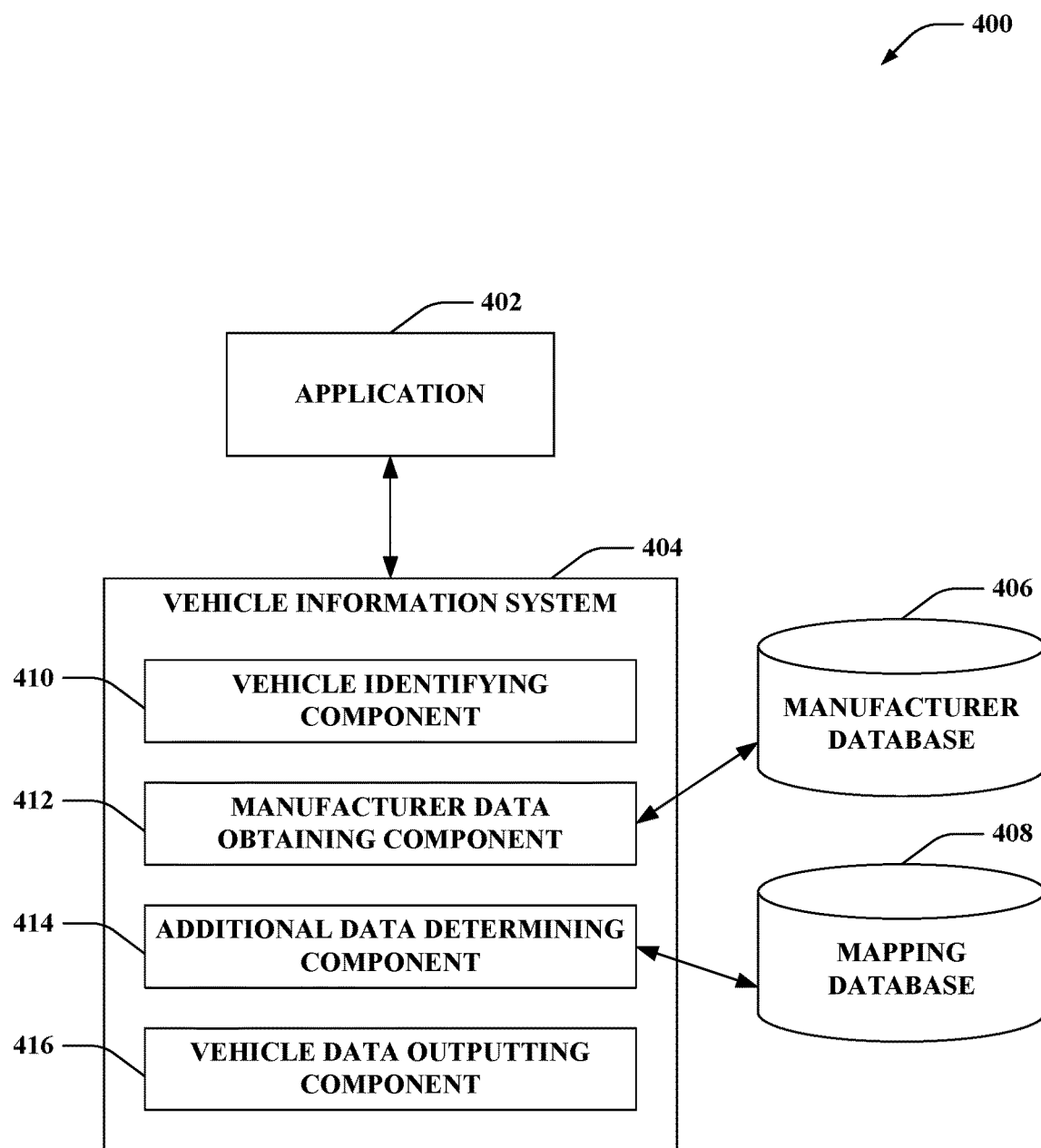
FIG. 4 is an aspect of an example vehicle information system and application communicating additional vehicle data.

FIG. 4 generally relates to a system 400 for identifying certain vehicle information for providing to an application. System 400 includes an application 402 for requesting vehicle information from a vehicle information system 404, a manufacturer database for storing vehicle data related to a vehicle identifier, such as a VIN, including manufacturer trim level, model codes, manufacturer codes, and/or option codes from which certain option information of the vehicle is discerned, and a mapping database 408 for storing one or more mapping tables to associate data in the manufacturer database 406 to one or more vehicle properties related to an application.

As used herein, manufacture code can refer to one or more codes that identify a build level configuration of a vehicle. The codes can be separate from the VIN, and can include information other than that encoded in the VIN, in one example, and can be specified by the manufacturer (e.g., at an assembly location) in the comprehensive original vehicle data. For example, a manufacturer code can include a model to specify a model of a vehicle, a trim code to specify a trim level (e.g., grand touring, limited, etc.), an engine code to specify an engine of the vehicle, a transmission code to specify a transmission of the vehicle, a drive-train code to specify a drive-train of the vehicle, an option code to specify one or more options of the vehicle, an option package code that correlates to a set of options on the vehicle, a color code to specify interior/exterior or other colors of the vehicle, etc. Thus, for example, comprehensive original vehicle data can be determined, at least in part, from the manufacturer codes, as described further herein. In addition, the type of data encoded in the VIN, and also the manufacturer codes, the types of manufacturer codes (e.g., whether trim is encoded in the VIN or presented as a manufacturer code), etc. can vary for a given vehicle manufacturer. It is to be appreciated that certain types of manufacturer code may be referred to herein without limitation, and additional or alternative manufacturer codes may be used in addition or in the alternative. In addition, it is to be appreciated that the manufacturer codes (and/or related codes, such as engine codes, option codes, etc.) can include substantially any value that can map to a description (e.g., an enumeration value, an integer, a string value, etc.), the description itself, and/or the like.

Vehicle information system 404 can include a vehicle identifying component 410 for obtaining a vehicle identifier, such as a VIN, from one or more applications, a manufacturer data obtaining component 412 for determining data from a manufacturer of the vehicle relating to the vehicle identifier, such as the trim level, option codes, or other manufacturer codes, an additional data determining component 414 for generating additional vehicle data for the vehicle based at least in part on the data from the manufacturer, and a vehicle data outputting component 416 for providing the supplemental data and/or the data from the manufacturer to the one or more applications.

According to an example, application 402 can provide a vehicle identifier, such as a VIN, to the vehicle information system. For example, the application 402 can correspond to a client having one or more processors, memory media, etc. to implement components or related functionality as described herein, vehicle information system 404 can correspond to a host server 12 having one or more processors, memory media, etc. to implement components or related functionality as described herein, and/or the like. Vehicle identifying component 410 can receive the vehicle identifier, and manufacturer data obtaining component 412 can query manufacturer database 406 to determine additional manufacturer data for the vehicle based on the vehicle identifier, which can comprise the comprehensive original vehicle data and/or can include supplemental data, as described herein. Mapping database 408 can include one or more mapping tables defining a relationship of the additional manufacturer data to one or more specific properties for a given application, such as application 402. For example, the properties can relate to individual vehicle options defined in the application 402, and can be mapped via the mapping tables in mapping database 408 to the additional manufacturer data. In this regard, additional data determining component 414 can query one or more tables or other structures of the mapping database 408 to receive additional vehicle data for the vehicle, and vehicle data outputting component 416 can report the additional vehicle data (and/or additional manufacturer data) to the application 402.

In one example, the additional manufacturer data received from manufacturer database 406 by manufacturer data obtaining component 412 can relate to an equipment package code. Mapping database 408 can include one or more tables that map the equipment package code to a list of corresponding vehicle options, where the list of options can be separately defined for one or more applications (e.g., and/or can include a generic definition corresponding to a text-based list of the options). For example, the one or more tables may map the equipment package further based on further information in the additional manufacturer data, such as trim level (e.g., an equipment package code may map to different options for different trim levels). In other examples, the one or more tables can map the equipment package code to a valuation for the package code, or other direct relationship between the package code and a property of application 402.

Figure 5:
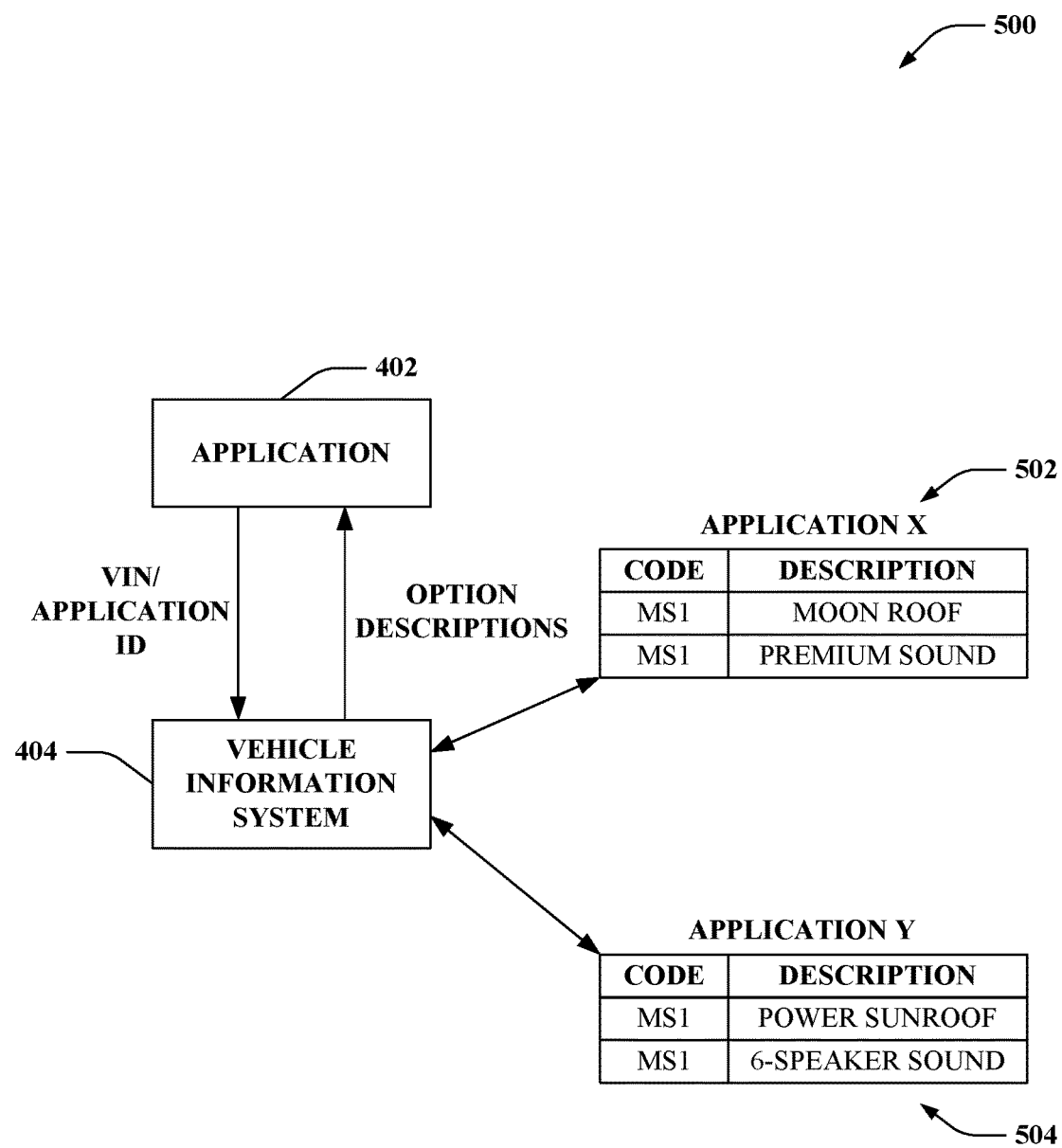
FIG. 5 is an aspect of an example vehicle information system and application communicating additional vehicle data based on application-specific tables.

In addition, the one or more tables may be application specific, such that an identifier of application 402 can also be provided to additional data determining component 414 for obtaining the appropriate additional vehicle data for the vehicle (or an appropriate format thereof). For example, referring to system 500 shown in FIG. 5, one application may refer to a "moon roof" option, as shown in table 502 for application X, while another application refers to a "power sunroof" option for the same option code, as shown in table 504 for application Y. Thus, the mapping tables 502 and 504, which can be stored in mapping database 408, can include the appropriate parameter correlated to the option code for the related application in the application-specific mapping table. Thus, where application 402 provides a VIN and application identifier to vehicle information system 404, vehicle information system 404 can determine the vehicle has certain option codes in the comprehensive original vehicle data based on the VIN (e.g., option code MS1), and can associate the option code to the appropriate description(s) for application 402 based on the application identifier (e.g., "moon roof" and "premium sound" where application 402 is identified as application X, or "power sunroof" and "6-speaker sound" where application 402 is identified as application Y. In any case, additional data determining component 414 can obtain the additional vehicle data and/or can format or otherwise obtain the additional vehicle data specifically for use with application 402.

Application 402 can be substantially any type of application that can provide vehicle information to vehicle information system 404, and receive additional vehicle data from vehicle information system 404. In one example, application 402 can specify an application identifier, output format type, or other parameters to affect the output of the additional vehicle data by vehicle information system 404. In a specific example, application 402 can include a vehicle valuation system that can be used in vehicle transactions, approving credit for vehicle purchasing, etc. It is to be appreciated that multiple vehicle valuation systems and methods may exist and may use varying criteria to define a vehicle for computing a valuation. In this regard, mapping database 408 can include tables for each valuation system that map the additional manufacturer data, such as equipment package code, to options defined in the valuation systems to allow for more accurate valuation of vehicles by the valuation systems. More accurate valuation can lend to improved loan value calculation for approving credit or financing for vehicles, improved insurance rate quotes and liability coverage, more accurate representations of the original manufacturer's suggested retail price (MSRP) for buying/selling used vehicles (e.g., specific to the VIN), etc., as opposed to merely identifying a vehicle by VIN, which may not allow for determining information other than year, make, and model of the vehicle, or other VIN-encoded information.

Figure 6:
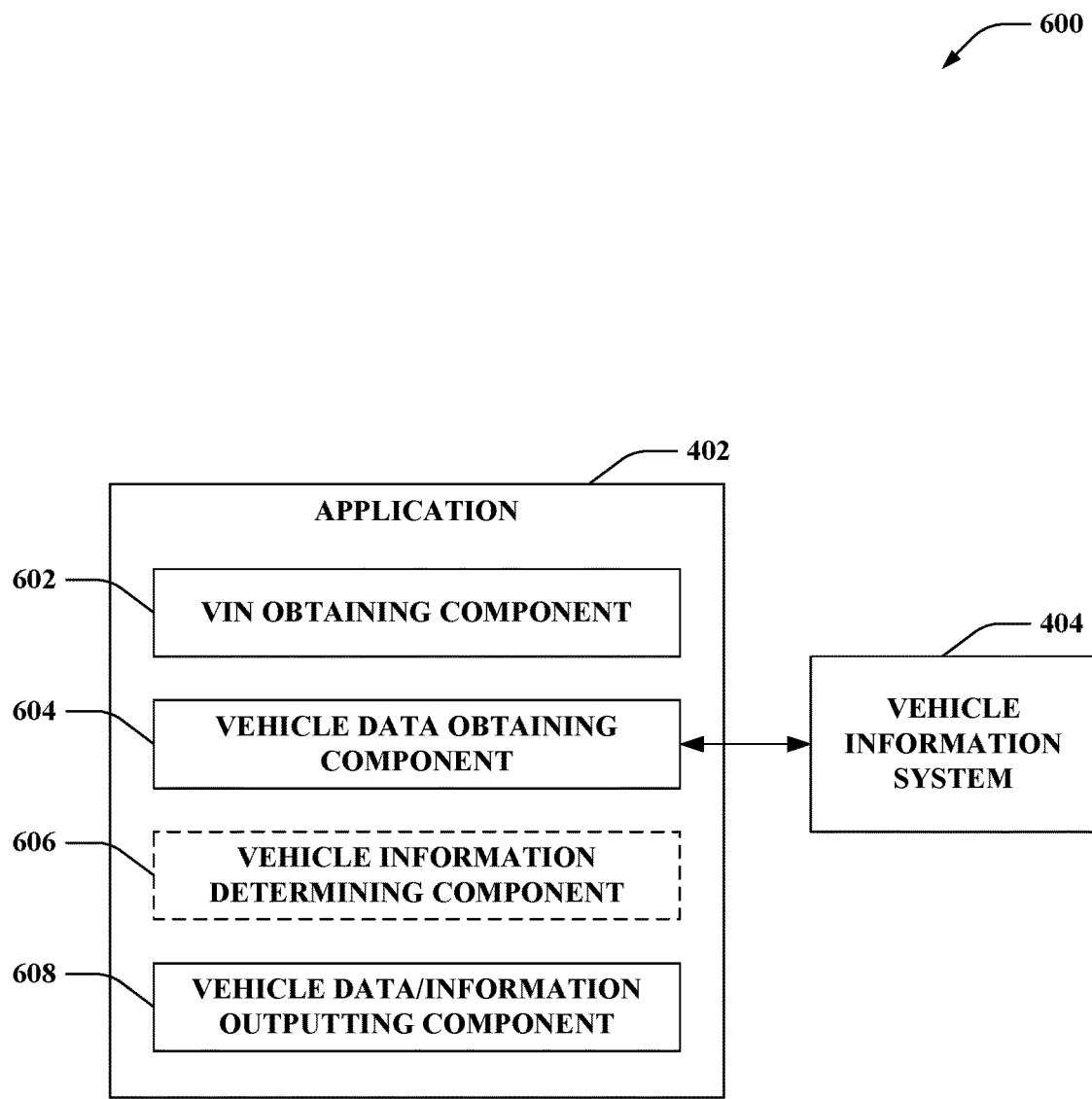
FIG. 6 is an aspect of an example application obtaining additional vehicle data from a vehicle information system.

FIG. 6 illustrates a system 600 for utilizing a vehicle information system 404 in determining additional vehicle data regarding a vehicle and optionally obtaining vehicle information such as a valuation for outputting application-specific vehicle data. System 600 includes an application 402 and a vehicle information system 404, as described, and can additionally include one or more related databases that store information for determining additional vehicle data based at least in part on additional manufacturer data. Application 402 includes a VIN obtaining component 602 for receiving a VIN of a vehicle, a vehicle data obtaining component 604 for receiving additional vehicle data and/or additional manufacturer data from a vehicle information system, an optional vehicle information determining component 606 for determining further vehicle-related information based on the additional vehicle data, and a vehicle data/information outputting component 608 for displaying the obtained additional vehicle data and/or vehicle-related information.

According to an example, VIN obtaining component 602 can receive a VIN of a vehicle. The receiving can include receiving an input of the VIN via substantially any input interface, such as a keyboard (e.g., an on-screen keyboard, a physical keyboard), microphone and voice recognition processor, barcode scanner, RFID reader and/or another input device that can receive the VIN from manual or automatic input. Thus, in one example, the application 402 can operate on a handheld device, such as a mobile phone or other mobile device that communicates with a communication network, such as a mobile network or other wireless network. In this example, application 402 can operate remotely from vehicle information system 404, and can communicate therewith by using one or more communication networks, as described. Vehicle data obtaining component 604 can communicate the VIN to vehicle information system 404 (e.g., over the one or more networks or otherwise), and vehicle information system 404 can communicate comprehensive original vehicle data, additional vehicle data, additional manufacturer information, etc. regarding the vehicle back to the application 402 based on the VIN. It is to be appreciated that application 402 can execute on substantially any device, such as a computer, tablet, mobile phone, personal digital assistant, barcode scanner, etc., which may include a similar configuration as server 12 including, for example, one or more processors 14 for executing instructions to perform the described functions, a computer-readable memory media 16 for storing the instructions or related information, databases 20, I/O platforms 22 for facilitating interaction with the application 402 through one or more interfaces, etc., as described.

As described, the data communicated to the application 402 can include additional manufacturer information derived from the VIN, such as year, make, model, etc., of the vehicle. The data communicated to the application 402 can additionally or alternatively include additional vehicle data retrieved by the vehicle information system 404, such as model code, manufacturer codes, or data obtained based on such codes that are associated with the VIN in received manufacturer data. For example, vehicle information system 404 can associate the model code, manufacturer codes, etc. to additional vehicle data using one or more mapping tables. The additional vehicle data can include a text list of vehicle options corresponding to the manufacturer codes, information formatted based on an identifier of application 402, a list of parameter values indicating vehicle options (e.g., as specified in the application 402 or otherwise), and/or the like. In an example, vehicle information determining component 606 can provide the additional vehicle data received by vehicle data obtaining component 604 to one or more services for generating further vehicle-related information, such as a valuation or other information computed based at least in part on at least a portion of the additional vehicle data. As described, in an example, the additional vehicle data can facilitate a more accurate valuation determination for the vehicle, which can improve processes in many industries and applications. The vehicle data/information outputting component 608 can output at least a portion of the additional vehicle data or additional manufacturer information received by vehicle data obtaining component 604, further vehicle-related information computed by vehicle information determining component to application 402, and/or the like.

Provided below are a list of various specific examples of industries and applications that can utilize vehicle information system 404 to obtain additional vehicle data for more accurate determination of a subject vehicle based on providing a VIN. These examples are not exhaustive of the certain applications and industries that can utilize the vehicle information system 404 to improve evaluation or other processing of vehicles.

In the automobile insurance industry, systems exist to originate insurance policies and provide policy premium quotes based on a vehicle. Currently, pricing is based on limited information gathered from the VIN and customer information of the vehicle through a series of questions. Thus, prices are quoted based on a generic model grouping due to the lack of information regarding the vehicle, such as additional information to subdivide based on the vehicle configuration, additional equipment and options, etc., which can equate to value. For example, a insurance quoting system is likely to quote a base model of a certain vehicle with no additional options at the same rate as the same year, make, and model vehicle with several options (e.g., moonroof, navigation, premium sound system, etc.), which may add hundreds or even thousands of dollars to the value of the vehicle. Since insurance premiums are largely based on the value of the item insured, adding this ability to obtain more detailed vehicle information from a vehicle information system 404 allows for more accurate premium quoting, which can save the consumer money for their base model, or more appropriately protect the high-optioned vehicle by offering differing premiums based on value. In this example, application 402 can perform the policy quoting/originating functionality based in part on obtaining the VIN, communicating with vehicle information system 404 to obtain additional vehicle data, optionally obtaining a valuation of the vehicle based on the additional vehicle data, and obtaining the additional vehicle data and/or valuation for determining an insurance premium for the vehicle, as described above.

Insurance companies also use systems to compute total loss and value for processing accident claims. When a claim is incurred and a value of a vehicle needs to be established, current systems are subject to relying on the customer, an agent, other employee, etc., to provide the additional information needed. The need for additional information is a result from the limited information coded into the VIN by the manufacturer. The results of this process can be costly, due to the cost of wages for the time needed to generate, research, and validate information, as well as inaccurate, due to the manual nature of the process. The current systems are also prone to create tension or strained relations between the parties, often resulting in lost revenue due to decreased customer retention. This is a result of a value being used based on a potentially biased user's inputs on items that are not clear, or easily identifiable, such as trim levels that are not designated, packages or options with descriptions like "performance," "luxury," and "technology" as their description, etc. Also, the many options or features that are not labeled and are often mechanical in nature (e.g. performance equipment or suspension) are currently identified through a disassembly process, which is not only impractical but also unlikely. Thus, application 402, in an example, can include such systems that can obtain additional vehicle data from a vehicle information system 404, as described, and optionally obtain a valuation based on such data, for more accurately processing accident claims for a given vehicle.

Lender systems also exist in the automobile industry to generate loan originations for vehicles based in part on a valuation of a vehicle. One metric used in loan evaluations is the Loan-To-Value (LTV). The formulas used may be as effective as the accuracy of the information input. Typically, the lender is not onsite or otherwise does not visually inspect or verify information regarding the vehicle, its related trim level, options, etc., and merely uses VIN to determine the LTV. Also, the many options or features that are not labeled and are often mechanical in nature (e.g. performance equipment or suspension) are identifiable mainly through a disassembly process, which is not only impractical but also unlikely. Thus, lenders typically only use VIN to obtain a value (based on information in the VIN itself), and/or otherwise receive vehicle information by relying on the user's knowledge of the product line, ability to visually identify trim level, options, integrity, etc., to provide these details to generate the results. Thus, application 402 can be a system that originates automobile loans based additionally on additional vehicle data from vehicle information system 404 where the lender can enter VIN and/or mileage information (and/or a system at the lender can automatically populate or generate a request to the vehicle information system 404 based on such data) to generate a more accurate value.

Additionally, consumers are currently pre-approved for a vehicle loan, after a qualification process, which may include verifying a credit rating, job type, income, etc. A preapproval can be obtained as part of this qualification process, as the value of a specific vehicle and other details of the vehicle have not yet been determined. Thus, the application 402 can be a system that converts a preapproval and/or approves automobile loans by providing the additional vehicle data from vehicle information system 404 where the user (consumer, lender, etc.) enters the VIN and mileage to generate the value. This can eliminate the need and dependency on a third party, such as the dealer/seller to provide this information, and to do so accurately, automating the process of determining such information.

Additionally, lending applications exist for computing a value of a vehicle for repossession. Currently, vehicle repossession/recovery involves verification of the value that was used in origination. To do this, typically a lender relies on a recovery agent, tow truck driver, or the auction for the description and verification of equipment. This can not only be inconsistent based on multiple persons involved, their knowledge, ability to verify but also the problem with relying on a visual verification, as discussed. Many features or options are not easily verified visually (e.g. performance package, sport package, model description, and other items that are often not labeled on the vehicle), and some features and equipment of the mechanical nature are likely to be identified through a disassembly process, which is not only impractical but also unlikely. Thus, application 402 can be a system for determining a vehicle value for repossession by using the vehicle information system 404 to acquire additional vehicle data based on providing a VIN thereto, as described.

In other examples, lending applications exist for batch processing of VINs and/or related securitization reports based on VINs. Where application 402 can be one or more of these lending applications, additional vehicle data can be obtained from vehicle information system 404, as described, to facilitate more accurate vehicle reporting.

Automobile auction systems also exist to track auction sales and pricing. Auction houses typically provide sales, records and historical data. These records may be as accurate as the details/description that was provided. This typically results in a price that is associated with a basic model description, often leaving out trim and option details that can impact the value significantly. Thus, application 402 can operate to track auction sales and pricing, and can obtain additional vehicle data from vehicle information system 404 based on a received VIN for associating with the recorded historical data. With the ever increasing growth of buyers/dealers using the internet to purchase their vehicles online/simulcast from the auction, the importance of an accurate description can be critical. When vehicle descriptions are inaccurate, it can result in reduced confidence from the buyer, therefore, lower bids and fewer sales. Also, inaccurate descriptions result in large revenue loss (or losses) through arbitration incurred by the auction. Thus, application 402 can be part of an auction system (e.g., a website, an in-house listing, etc.) that obtains additional vehicle data for a vehicle being auctioned from vehicle information system 404, and the vehicle data/information outputting component 608 can provide additional vehicle data to the auction site.

Additionally, descriptive vehicle listing sites allow consumers or dealers to list vehicle for sale. Online listing descriptions similarly rely on input of a person listing the vehicle to obtain the description and details of the vehicle, whether a consumer in a consumer generated ad or a dealer for a dealer ad or website. This again can result in errors or inconsistencies between the listing and the actual vehicle information. For example, buyers may then compare prices of vehicles that are not comparable and should not be included in their search results, which can create consumer frustration and reduced confidence in these results, but also can lead to a consumer purchasing a different vehicle than they thought they were buying. In addition, for dealerships, inputting information for each received automobile can be difficult and time-consuming. Also, dealerships can manually input vehicle data for printing window stickers or other documents related to the vehicle, determining MSRP, etc. Thus, application 402 can be part of a vehicle listing site or dealership system to allow for obtaining additional vehicle data from vehicle information system 404 to mitigate errors in manual entry of descriptive vehicle information.

Additional systems that can utilize application 402 to improve vehicle valuation include true market value applications that retain records of vehicle sales to determine true market value for the vehicle. For example, application 402 can be part of such applications to obtain additional vehicle data for vehicles for which true market value is tracked to allow for more accurate value based on the additional vehicle data. Also, government agencies determine personal property tax amounts, vehicle registration amounts, etc., based on valuation of an automobile. Tax amounts can be referred using various terms, such as property tax, excise tax, or other vehicle taxes. The descriptions herein are intended to apply to any such tax that a government agency applies for a vehicle, the accuracy of which can be improved by determining aspects of the vehicle that impact its market value, purchase price, etc. Thus, application 402 can be part of such systems as well, and the additional vehicle data obtained from vehicle information system 404 based on an inputted VIN can allow for more accurate determination of value of the vehicle for determining property tax or registration fees based on the additional vehicle data.

In yet another example, application 402 can execute on a user device such that a consumer can obtain vehicle information or valuation based on scanning a VIN (e.g., at a dealership or otherwise). For example, VIN obtaining component 602 can receive the VIN (e.g., from a scanner function on the user device, which can include a camera to image the VIN or related barcode). Vehicle data obtaining component 604 can receive additional vehicle data for the vehicle based on providing the VIN to the vehicle information system 404, as described. Vehicle information determining component 606 can determine a valuation for the vehicle based on the additional vehicle data (and/or VIN coded information), and vehicle data/information outputting component 608 can output the valuation and/or a portion of the additional vehicle data. This can provide a consumer with the ability to determine automobile values while on a car lot, which can strength negotiating position of the consumer.

In yet another example, vehicle information determining component 606 can provide the additional vehicle data and/or valuation to other services (not shown), such as an insurance quoting service, a lender service, etc., to receive insurance quotes and/or lending quotes, which can be displayed by vehicle data/information outputting component 608. Thus, the consumer can further estimate cost of insurance and/or payments. In one example, vehicle information determining component 606 can provide additional information regarding the consumer, such as credit history or parameters for determining credit history (e.g., social security number), for more accurate quoting. Vehicle information determining component 606 can receive the additional parameters via input on an interface, obtained from a profile of the user, and/or the like. In one example, application 402 can allow the user to obtain a quoted insurance policy or pursue lending for purchasing the vehicle.

In one example, one or more components of application 402 can execute remotely from other components, on different devices, and/or the like (e.g., as a distributed or multi-tiered application), as described further herein. For example, VIN obtaining component 602 can operate on a mobile device or other personal device of a consumer, allowing the consumer to scan or otherwise obtain VINs of one or more vehicles. The VIN obtaining component 602 can communicate the VIN to vehicle data obtaining component 604, which may be located at an insurance provider, lender, and/or the like. Vehicle data obtaining component 604 can communicate the VIN to vehicle information system 404 to receive additional vehicle data from which a valuation can be determined, a valuation, and/or the like. Vehicle information determining component 606 can obtain other data regarding the consumer or vehicle as previously provided by the consumer (e.g., in a pre-approval process), and can determine information specific to the vehicle and the consumer based at least in part on the additional vehicle data or valuation data, and the other data regarding the consumer or vehicle.

In one example, vehicle information determining component 606 can determine a loan approval information for the consumer (e.g., loan amount, interest rate, etc.) based on the additional vehicle data, valuation data, and/or the other data regarding the consumer or vehicle (which may include a credit report, for example). In another example, vehicle information determining component 606 can determine an insurance quote for the consumer (e.g., premium, coverage amounts, etc.) based on the additional vehicle data, valuation data, and/or the other data regarding the consumer or vehicle (which may include an accident history, driving record, etc., for example). In any case, vehicle data/information outputting component 608 can also operate on the mobile device or other personal device of the consumer, and the vehicle information determining component 606 can provide the determined vehicle information (e.g., loan approval information, insurance quote, etc.) to vehicle data/information outputting component 608 for display on the device. In this regard, for example, the consumer can scan a VIN and obtain the vehicle information in real-time, or near real-time, to determine whether they are approved, potential monthly out-of-pocket expense, etc. related to the vehicle. This gives the consumer confidence in determining whether they wish to purchase the vehicle knowing what sort of loan and/or insurance for which they are approved. It is to be appreciated, for example, that vehicle information determining component 606 can return a list of competing loan approvals, insurance policies, etc., and/or application 402 can allow the consumer to select a loan approval, insurance policy, etc. for purchasing the vehicle.

Figure 7:
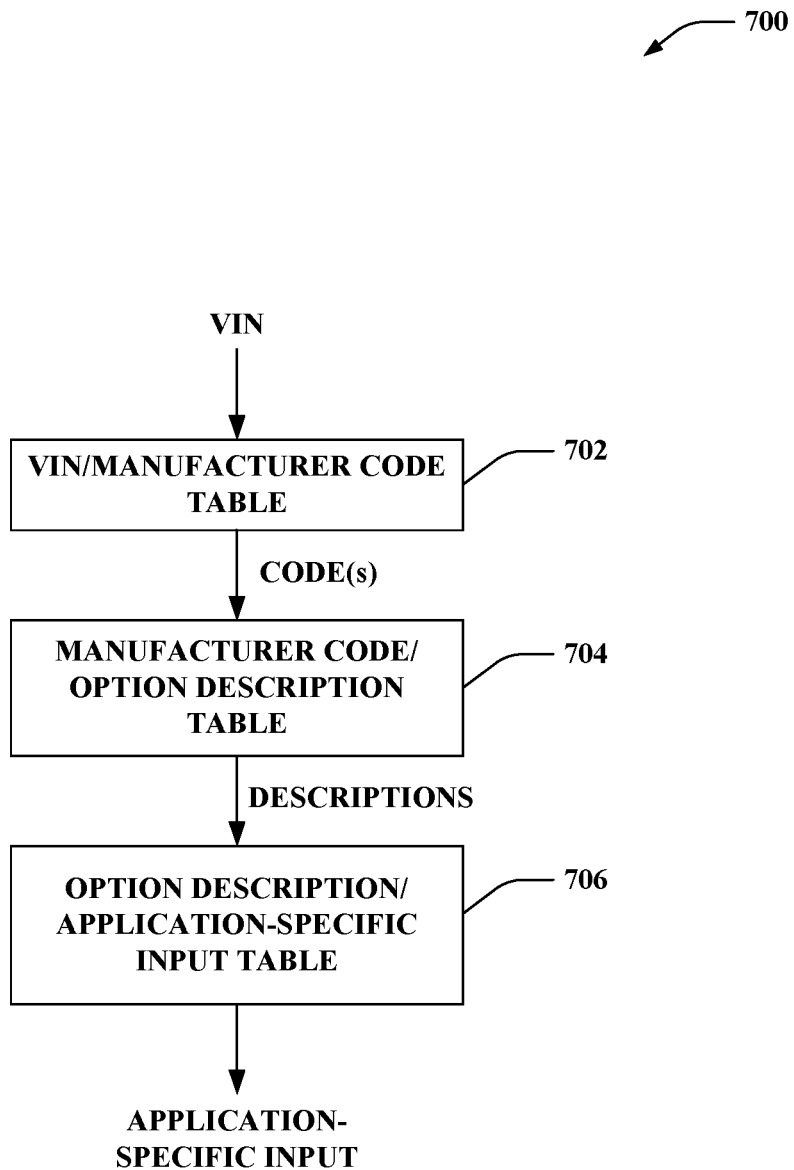
FIG. 7 is an aspect of an example collection of tables to facilitate obtaining additional vehicle data.

FIG. 7 illustrates an example collection of tables 700 that can exist in one or more databases or other memory media, as described herein, to facilitate obtaining additional vehicle data based on a VIN. For example, the tables 700 can be included in one or more of a manufacturer database 406 or a mapping database 408 to facilitate functionality described herein. A VIN/manufacturer code table 702 is provided that maps VINs to one or more manufacturer codes or other additional manufacturer information related to the VIN. The additional manufacturer information can identify options on the vehicle including interior/exterior options, powertrain options, colors, and/or the like. The manufacturer codes can include a model code, codes that correspond to one or more available options (e.g., for the model code or otherwise), etc.

In addition, VIN/manufacturer code table 702 can include supplemental data regarding the vehicle that correlates to aftermarket options added by a vehicle service provider, as described herein. This can include additional manufacturer codes, other specific aftermarket codes, etc. A manufacturer code/option description table 704 is provided that maps the manufacturer codes (and/or aftermarket codes) to one or more option descriptions or codes that correspond to the manufacturer codes. In one example, the manufacturer code includes a trim line, which can correlate to a set of option descriptions or codes, though additional upgraded options can be provided by additional manufacturer codes for a given VIN.

An option description/application-specific input table 706 is provided to map the option descriptions to application-specific input parameters to allow operability of the additional vehicle data in various systems. The option descriptions may translate to different application-specific input, and thus using a table specific to a given application can ensure option descriptions are properly interpreted for use with the given application. For example, given a VIN, the various tables 702, 704, and 706 are traversed to obtain application-specific input of additional vehicle data corresponding to the vehicle based on the VIN by obtaining one or more manufacturer codes from the VIN using table 702, obtaining one or more option descriptions from the code(s) using table 704, and obtaining application-specific input of additional vehicle data from the descriptions using table 706.

In one specific example, the VIN/manufacturer code table 702 can associate a VIN to certain information encoded in the VIN and other additional manufacturer information, such as model year, make, model, trim, transmission, engine, model code, exterior/interior color, MSRP, and/or a list of option codes. It is to be appreciated that some of this information (e.g., engine, transmission, color, etc.) may be additionally or alternatively coded as an option code. The information and format received from the manufacturer in the VIN/manufacturer code table 702 can greatly vary between manufacturers. As described, some manufacturers may include certain items in the VIN, which may not then be in the VIN/manufacturer code table 702. In one specific example, the VIN/manufacturer code table 702 can have a format similar to the following:

| Field | Value |
|---|---|
| Vehicle VIN | XYZF4KL485S2938495 |
| Model Year | 2010 |
| Make Name | MakeA |
| Model Name | ModelB |
| Trim-Transmission | 4D Grand Touring AWD |
| Model code | MAMB4GT |
| Exterior color | Black |
| Option Codes | MS1, PR2, NVT, TLH, UE1 |
| MSRP | $32,449 |

Thus, given the VIN, some additional manufacturer information regarding the vehicle can be determined, in addition to the list of manufacturer codes.

The manufacturer code/option description table 704, for example, can associate the possible manufacturer codes included in the additional manufacturer information with a description of the codes. This table can also be received from the manufacturer, in one example. For example, each code can relate to one or more options. In the example above, a sample manufacturer code/option description table 704 may have a format similar to the following:

| Option Code | Description |
|---|---|
| MS1 | Moon Roof/MP3 Sound Package |
| PR2 | Power Rear Lift |
| NVT | Navigation w/Traffic |
| TLH | Trailer Hitch |
| UE1 | ULEV Emissions |
| WFL | All Weather Floor Mats |
| RS2 | Folding Rear Seat |

Thus, given the list of option codes for the vehicle, a plurality of option descriptions can be identified for the vehicle, which allows for providing a more accurate description of the vehicle, leading to more accurate valuation for insurance quoting, lending, sale descriptions, auction records, tax computation, etc., as described herein.

In addition, in an example, the option description/application-specific input table 706 can associate the option descriptions with alternate descriptions or other input strings compatible with certain applications. It is to be appreciated that the option description/application-specific input table 706 can also associate a model code or other information from the VIN/manufacturer code table 702 with application-specific input. For example, the option description/application-specific input table 706 can have a format that associates the year, make, model, trim, model code, and option codes, to specific parameter strings for use with a certain valuation system. For instance, the option description-application specific input table 706 can list possible option descriptions for the valuation system, which may differ in name from the option descriptions in the manufacturer code/option description table 704. Thus, for a given year, make, model, trim, and model code of a vehicle, the option description-application specific input table 706 can indicate the application-specific descriptions to specify given one or more option codes for the vehicle. In the example above, the option description/application-specific input table 706 may associate option code MS1 for the example MakeA ModelB, trim level 4D Grand Touring AWD, and model code MAMB4GT vehicle with the application-specific descriptions "Powered Sunroof," "6-Disc Changer/MP3," and "Premium Sound" and so on. In this example, the application-specific input can be provided to the application to perform operations relating to the vehicle based on the additional vehicle data.

It is to be appreciated, however, that the option description/application specific input table 706 can include inputs other than alternate descriptions, depending on the input the application desires to receive. For example, the inputs mapped to the option descriptions in the table 706 can relate to another certain string, code, enumeration, etc. operable to identify the options to the application. The input can additionally or alternatively be specified as a related dollar value in the table 706 (e.g., MS1 for the vehicle above may relate to an extra $600 in value). Thus, the option description/application-specific input table 706 can be defined specific to the application to provide desired input based on determining options on the identified vehicle.

Referring to FIGS. 8-17, additional methodologies that can be utilized in accordance with various aspects described herein are illustrated. While, for purposes of simplicity of explanation, methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects. In addition, in accordance with aspects described herein, the methodologies 800, 900, 1000, 1100, 1200, 1300, 1400, 1500, 1600, and 1700 can be implemented by one or more processors, and/or based on instructions stored in a memory media, using one or more local or distributed computing systems, for example. In one example, a client, host server 12, application 402, vehicle information system 404, user device, etc. may perform one or more of the foregoing methodologies 800, 900, 1000, 1100, 1200, 1300, 1400, 1500, 1600, or 1700 to provide functionality described herein.

Figure 8:
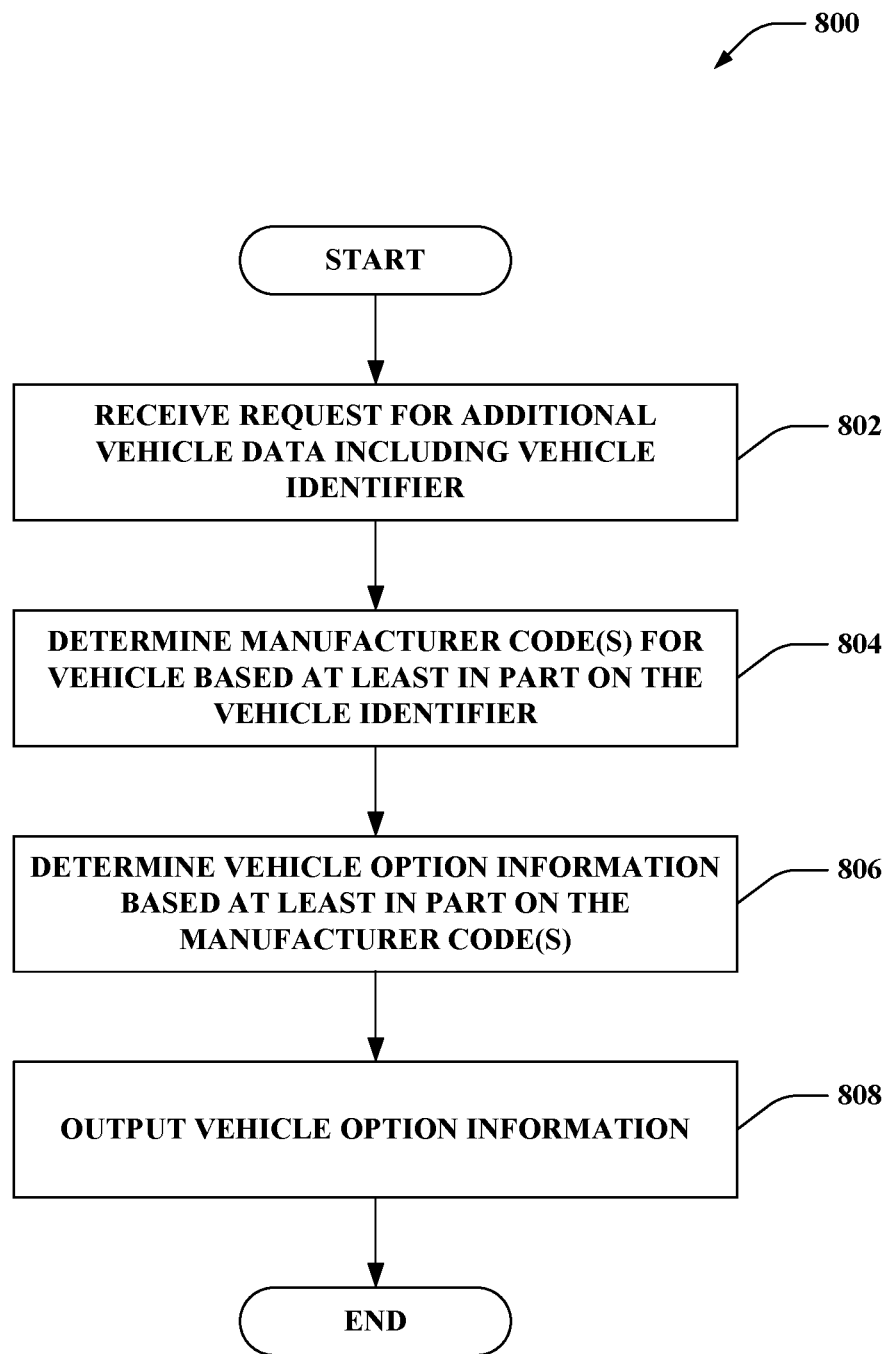
FIG. 8 is an aspect of an example methodology for obtaining vehicle option information.

FIG. 8 illustrates an example methodology 800 for obtaining option information based on a vehicle identifier. At 802, a request for additional vehicle data including a vehicle identifier is received. For example, the vehicle identifier can include a VIN. The request can be received from an application, input from an interface, etc. At 804, one or more manufacturer codes for the vehicle can be determined based at least in part on the vehicle identifier. For example, a database mapping VINs to manufacturer codes can be queried to determine additional manufacture information that comprises the manufacturer codes associated with the VIN. The database can be managed by, or managed based on data received from, a vehicle manufacturer for associating vehicles by VIN with option codes, color, body style, trim level, and/or similar information as installed at the manufacturer, as described. At 806, vehicle option information can be determined based at least in part on the one or more manufacturer codes. For example, this can include querying a database mapping the codes to the various options represented by each code and/or by a combination of codes, a combination of code and trim level or other option, etc. In one example, the database can include mapping the codes to textual description of the options, or the database can be specific to certain applications such that the codes are mapped to specific input for the applications. At 808, the vehicle option information can be outputted.

Figure 9:
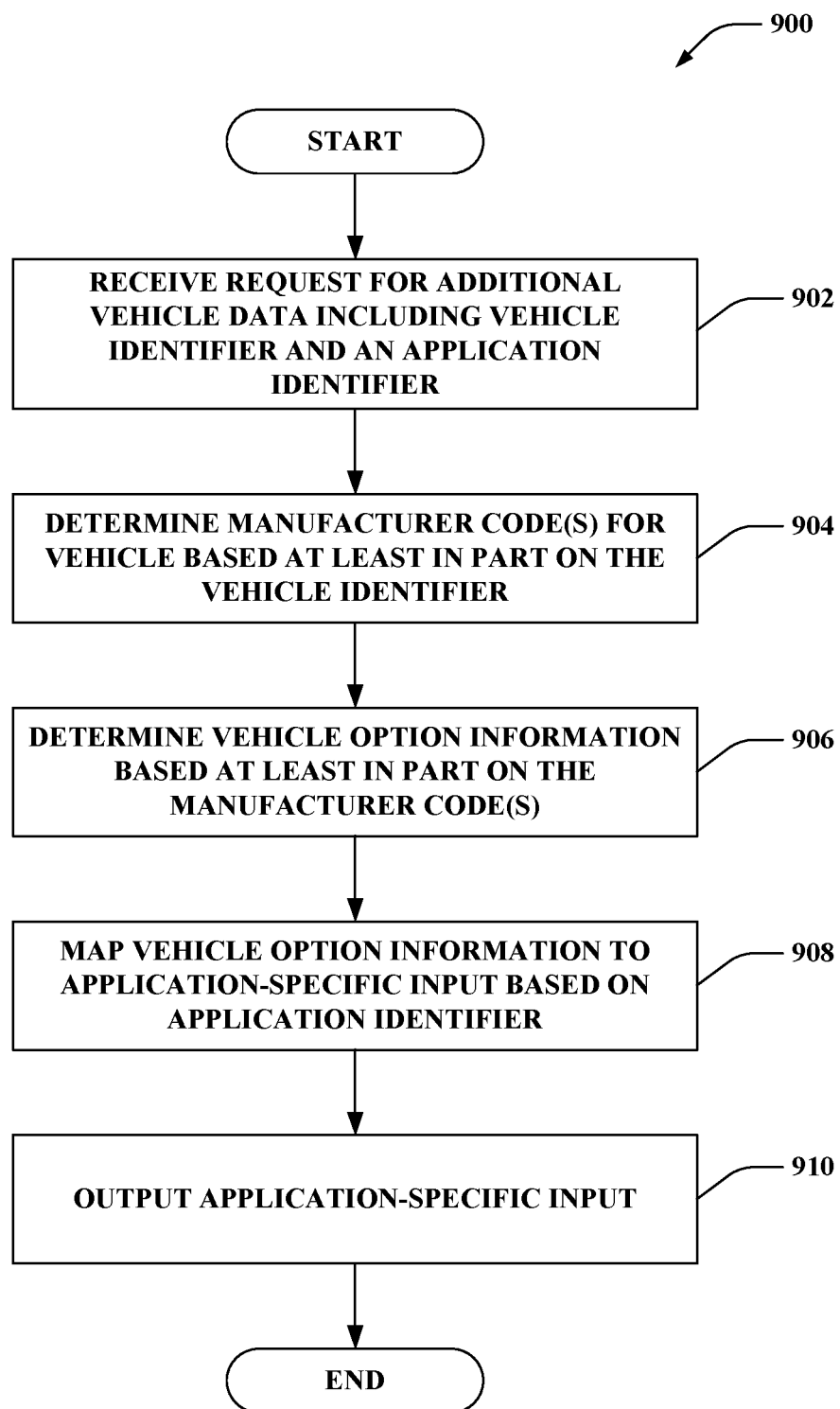
FIG. 9 is an aspect of an example methodology for obtaining application-specific input for a vehicle based on a vehicle identifier.

FIG. 9 illustrates an example methodology 900 for obtaining additional information for an application based on a vehicle identifier where the information is output in an application-specific format. At 902, a request for additional vehicle data including a vehicle identifier and an application identifier is received. For example, the vehicle identifier can include a VIN. The request can be received from the application, input from an interface, etc. The application identifier can be a unique string that identifies an application or a related format (or a corresponding mapping table) for the additional vehicle data. At 904, one or more manufacturer codes for the vehicle can be determined based at least in part on the vehicle identifier. For example, a database mapping VINs to manufacturer codes can be queried to determine the additional manufacturer information comprising the manufacturer codes associated with the VIN. The database can be managed by, or managed based on data received from, a vehicle manufacturer for associating vehicles by VIN with option codes, color, body style, trim level, and/or similar information as installed at the manufacturer, as described. At 906, vehicle option information can be determined based at least in part on the one or more manufacturer codes. For example, this can include querying a database mapping the codes to the various options represented by each code and/or by a combination of codes, a combination of code and trim level or other option, etc. In one example, the database can include mapping the codes to textual description of the options, or the database can be specific to certain applications such that the codes are mapped to specific input for the applications.

At 908, the vehicle option information can be mapped to application-specific input based on the application identifier. This can include querying a database that maps the option information to the application-specific input. For example, a certain manufacturer code may be used to indicate presence of a moon roof on some models. Thus, at 906, the moon roof option can be determined based on the manufacturer code(s) (e.g., alone or in conjunction with trim level or other vehicle information obtained based on the vehicle identifier). The application, however, may use the term "sunroof" to describe all such roofs, and thus at 908, the moon roof option can be mapped to "sunroof" (e.g., or a related application-specific code for the sun roof option). At 910, the application-specific input can be outputted. The application, for example, can utilize this input to perform one or more functions using the additional vehicle data. As described, the application can relate to a vehicle valuation system that determines vehicle value based in part on the additional vehicle data, an insurance policy quoting, underwriting, etc. system that determines insurance policy information based at least partly on additional vehicle data, lending systems for determining loan origination, repossession value, securitization reporting, etc. based in part on the additional vehicle data, auction listings that list vehicles for auction and/or systems that track auction sales and pricing based at least in part on the additional vehicle data, descriptive listing systems that depict vehicles for sale, their related options, MSRP, etc., determined based in part on the additional vehicle data, government agency systems that compute personal property tax or vehicle registration fees or other information based at least in part on the additional vehicle data, consumer systems that allow for rapid vehicle valuation based on entering a vehicle identification number (and/or can obtain related insurance or lending quotes, etc.), and/or substantially any application that can derive value from obtaining the additional vehicle data.

Figure 10:
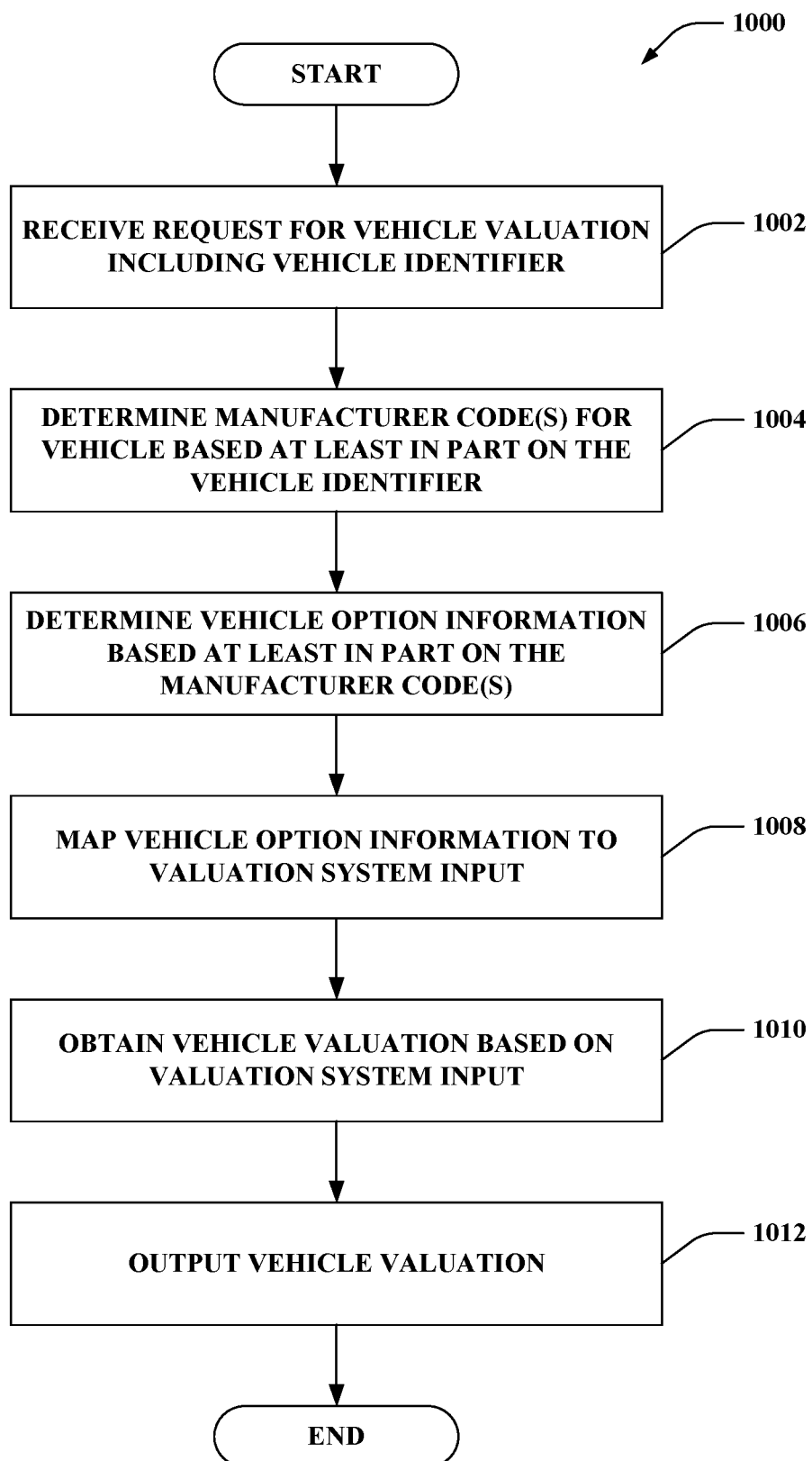
FIG. 10 is an aspect of an example methodology for obtaining a vehicle valuation based on a vehicle identifier.

FIG. 10 illustrates an example methodology 1000 for obtaining a vehicle valuation based on additional information retrieved using a vehicle identifier. At 1002, a request for vehicle valuation including a vehicle identifier is received. For example, the vehicle identifier can include a VIN. The request can be received from an application, input from an interface, etc. At 1004, one or more manufacturer codes for the vehicle can be determined based at least in part on the vehicle identifier. For example, a database mapping VINs to manufacturer codes can be queried to determine the additional manufacturer information comprising the manufacturer codes associated with the VIN. The database can be managed by, or managed based on data received from, a vehicle manufacturer for associating vehicles by VIN with option codes, color, body style, trim level, and/or similar information as installed at the manufacturer. At 1006, vehicle option information can be determined based at least in part on the one or more manufacturer codes. For example, this can include querying a database mapping the codes to the various options represented by each code and/or by a combination of codes, a combination of code and trim level or other option, etc. At 1008, the vehicle option information can be mapped to valuation system input to allow a vehicle valuation system to determine valuation based at least in part on the option information. At 1010, a vehicle valuation is obtained based on the valuation system input. Thus, for example, a vehicle with certain options can be assigned a different value than a vehicle without the options or with different options, though the vehicles may be of the same year, make, model, trim level, etc. At 1012, the vehicle valuation can be output. Similarly, the vehicle valuation can be output at 1012 to one or more applications described above that can take the vehicle valuation as input (e.g., to determine loan parameters, repossession value, insurance premium, etc.).

Figure 11:
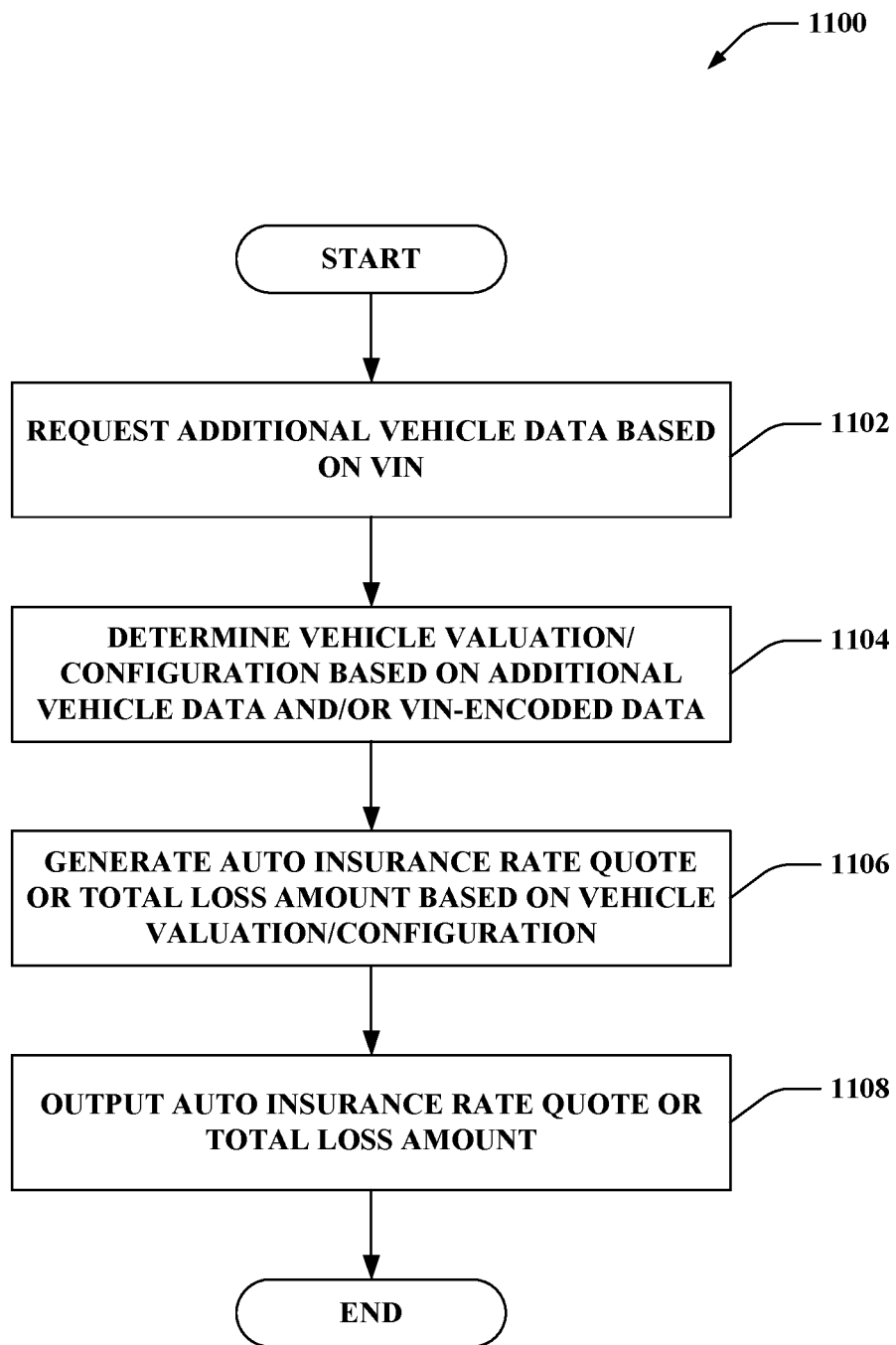
FIG. 11 is an aspect of an example methodology for determining auto insurance information based at least in part on additional vehicle data.

FIG. 11 illustrates an example methodology 1100 for determining auto insurance information based at least in part on additional vehicle data. At 1102, additional vehicle data can be requested based on a VIN. As described, in one example, this can include inputting the VIN into an application for obtaining auto insurance information for a vehicle associated with the specific VIN, and the additional vehicle data can be requested from a vehicle information system, which may be remotely located with respect to the application. At 1104, a vehicle valuation/configuration is determined based on additional vehicle data and/or VIN-encoded data. As described, the additional vehicle data can relate to comprehensive original vehicle data obtained based on the VIN (e.g., by obtaining manufacturer codes associated with the VIN, determining option descriptions, codes, etc. associated with the manufacturer codes, trim level, model, or other information encoded in the VIN or otherwise obtainable based on the VIN from manufacturer provided information, supplemental vehicle data, etc., and/or the like). Thus, the vehicle can be identified in terms of its build level configuration based at least in part on the additional vehicle data, and/or the valuation at 1104 can then correlate to the build level configuration. In one example, the vehicle valuation can be determined at 1104 by a third-party evaluator or evaluation application by providing the additional vehicle data, VIN, VIN-encoded data, etc. thereto for receiving the valuation.

At 1106, an auto insurance rate quote or total loss amount can be generated based on the vehicle valuation/configuration. In this regard, the rate quote or total loss amount is based on the additional vehicle data, whether based on the data itself or a valuation computed therefrom, to provide a more accurate value in determining the rate quote or loss amount. Generating the rate quote or total loss amount can include specifying the valuation or the additional vehicle data, VIN-encoded data, etc., to a backend system that determines rate quotes or total loss amounts. At 1108, the rate quote or total loss amount is outputted. For example, this can include displaying the rate quote or total loss amount on a display, indicating the rate quote or total loss amount to another system, etc.

Figure 12:
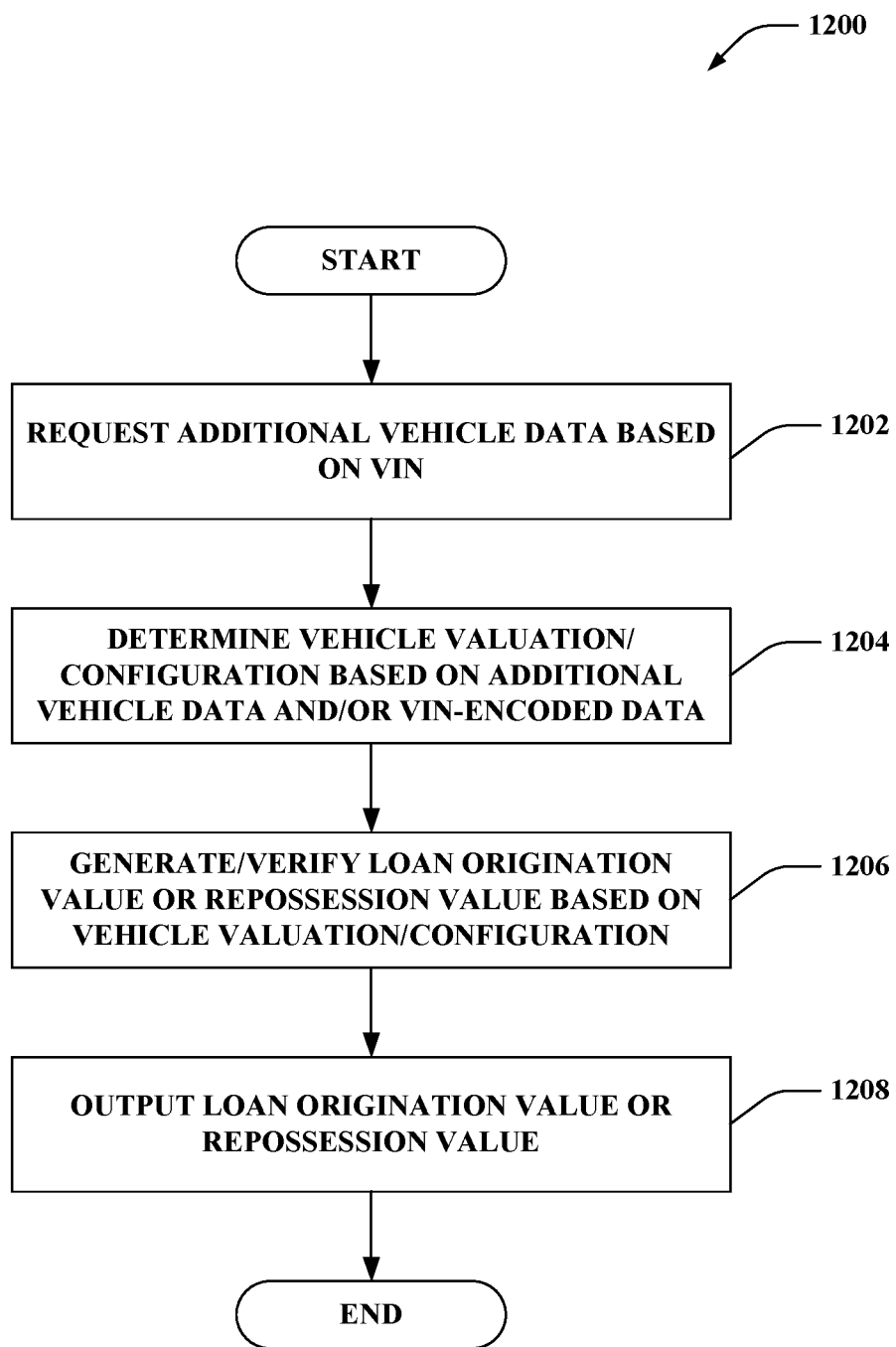
FIG. 12 is an aspect of an example methodology for determining loan origination or repossession values for a vehicle based at least in part on additional vehicle data.

FIG. 12 illustrates an example methodology 1200 for determining loan origination or repossession values for a vehicle based at least in part on additional vehicle data. At 1202, additional vehicle data can be requested based on a VIN. As described, in one example, this can include inputting the VIN into an application for obtaining loan origination or repossession information for a vehicle associated with the specific VIN, and the additional vehicle data can be requested from a vehicle information system, which may be remotely located with respect to the application. At 1204, a vehicle valuation/configuration is determined based on additional vehicle data and/or VIN-encoded data. As described, the additional vehicle data can relate to comprehensive original vehicle data obtained based on the VIN (e.g., by obtaining manufacturer codes associated with the VIN, determining option descriptions, codes, etc. associated with the manufacturer codes, trim level, model, or other information encoded in the VIN or otherwise obtainable based on the VIN from manufacturer provided information, supplemental vehicle data, etc., and/or the like). Thus, the vehicle can be identified in terms of its build level configuration based at least in part on the additional vehicle data, and/or the valuation at 1204 can then correlate to the build level configuration. In one example, the vehicle valuation can be determined at 1204 by a third-party evaluator or evaluation application by providing the additional vehicle data, VIN, VIN-encoded data, etc. thereto for receiving the valuation.

At 1206, a loan origination value or repossession value can be generated (or verified—e.g., for a previous valuation) based on the vehicle valuation/configuration. In this regard, the loan origination or repossession value is based on the additional vehicle data, whether based on the data itself or a valuation computed therefrom, to provide a more accurate value in determining the value. Generating the loan origination or repossession value can include specifying the valuation or the additional vehicle data, VIN-encoded data, etc., to a backend system that determines values for loan origination or repossession. At 1208, the loan origination value or repossession value is outputted. For example, this can include displaying the value on a display, indicating the value to another system, etc.

Figure 13:
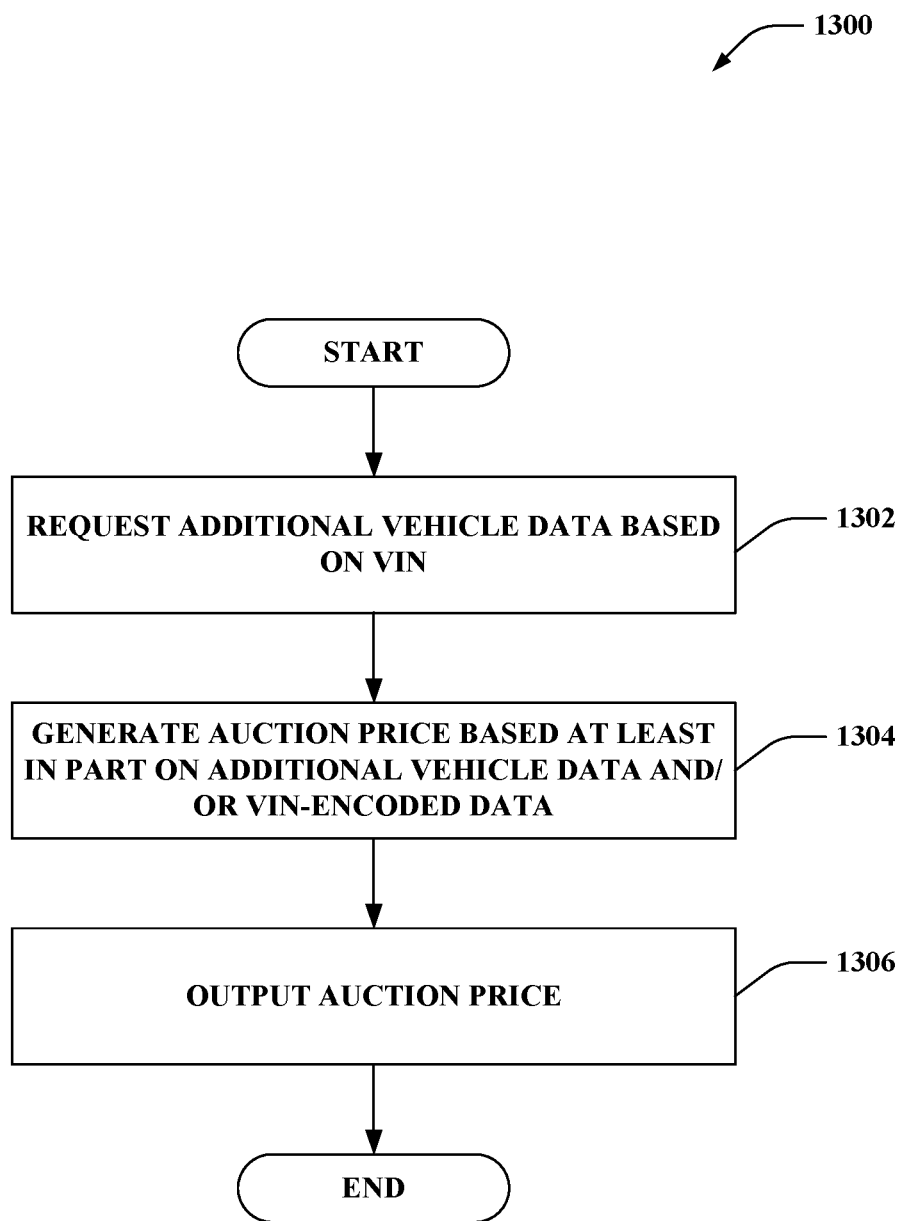
FIG. 13 is an aspect of an example methodology for determining auction price for auction sales for a vehicle based at least in part on additional vehicle data.

FIG. 13 illustrates an example methodology 1300 for determining auction price for auction sales for a vehicle based at least in part on additional vehicle data. At 1302, additional vehicle data can be requested based on a VIN. As described, in one example, this can include inputting the VIN into an application for computing an auction price for a vehicle associated with the specific VIN, and the additional vehicle data can be requested from a vehicle information system, which may be remotely located with respect to the application. At 1304, an auction price is generated based at least in part on additional vehicle data and/or VIN-encoded data. As described, the additional vehicle data can relate to comprehensive original vehicle data obtained based on the VIN (e.g., by obtaining manufacturer codes associated with the VIN, determining option descriptions, codes, etc. associated with the manufacturer codes, trim level, model, or other information encoded in the VIN or otherwise obtainable based on the VIN from manufacturer provided information, supplemental vehicle data, etc., and/or the like). In one example, the auction price can be generated at 1304 by a third-party evaluator or evaluation application by providing the additional vehicle data, VIN, VIN-encoded data, etc. thereto for receiving the price. In addition, for example, the auction price can be determined at 1304 based in part on historical auction prices for similarly equipped vehicles based on the additional vehicle data. Moreover, the price can be a price for on-line or in-line buyers alike. At 1306, the auction price is outputted. For example, this can include displaying the price on a display, indicating the price to another system, etc. In one example, the auction price can be outputted at 1306 to an auction history database with at least a portion of the additional vehicle data for determining subsequent auction prices for similarly equipped vehicles, as described.

Figure 14:
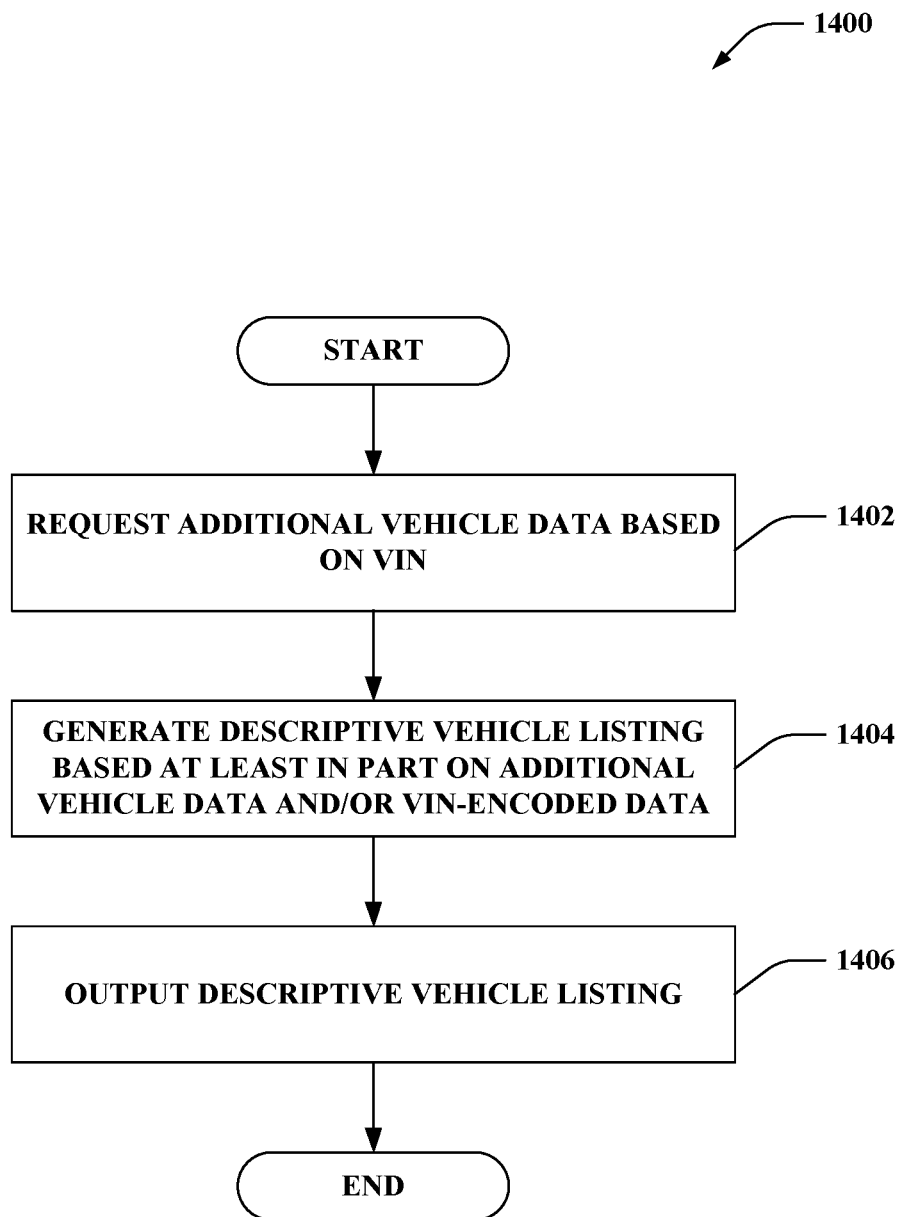
FIG. 14 is an aspect of an example methodology for generating a descriptive listing of a vehicle based at least in part on additional vehicle data.

FIG. 14 illustrates an example methodology 1400 for generating a descriptive listing of a vehicle based at least in part on additional vehicle data. At 1402, additional vehicle data can be requested based on a VIN. As described, in one example, this can include inputting the VIN into an application for generating a descriptive listing of a vehicle associated with the specific VIN, and the additional vehicle data can be requested from a vehicle information system, which may be remotely located with respect to the application. At 1404, a descriptive listing is generated based at least in part on additional vehicle data and/or VIN-encoded data. As described, the additional vehicle data can relate to comprehensive original vehicle data obtained based on the VIN (e.g., by obtaining manufacturer codes associated with the VIN, determining option descriptions, codes, etc. associated with the manufacturer codes, trim level, model, or other information encoded in the VIN or otherwise obtainable based on the VIN from manufacturer provided information, supplemental vehicle data, etc., and/or the like). In one example, the descriptive listing can be generated at 1404 by a third-party evaluator or evaluation application by providing the additional vehicle data, VIN, VIN-encoded data, etc. thereto for receiving the listing or data to generate the listing. At 1406, the descriptive vehicle listing is outputted. For example, this can include printing a vehicle description window sticker for the vehicle, generating a webpage including the descriptive listing (e.g., on a vehicle sale website or other service, auction house website or other informational system—e.g., on-site at the auction house), etc. to provide consumer confidence in an accurate description and/or protect the seller by listing the build level configuration details of the vehicle.

Figure 15:
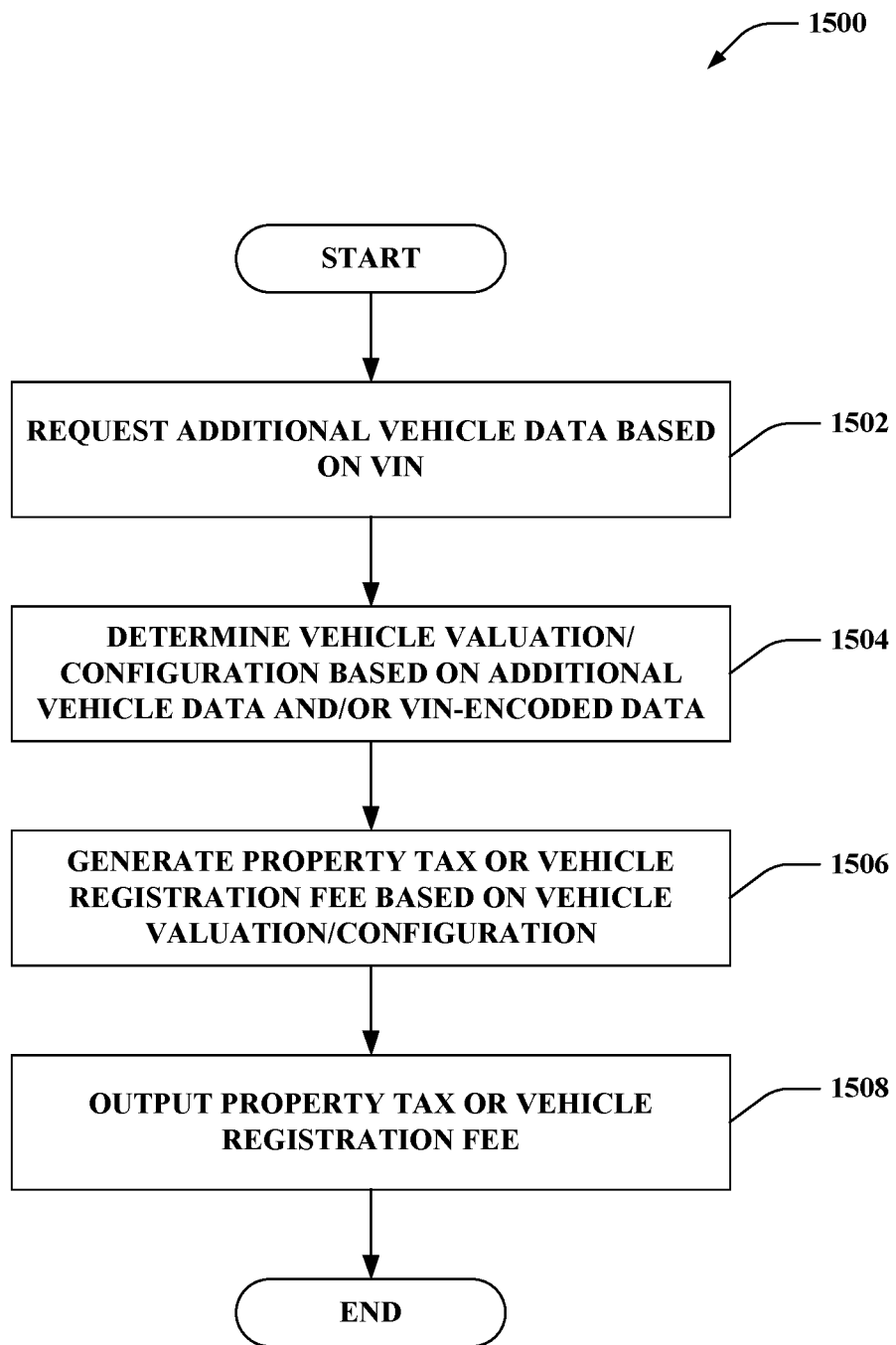
FIG. 15 is an aspect of an example methodology for determining property tax or vehicle registration fees for a vehicle based at least in part on additional vehicle data.

FIG. 15 illustrates an example methodology 1500 for determining property tax or vehicle registration fees for a vehicle based at least in part on additional vehicle data. At 1502, additional vehicle data can be requested based on a VIN. As described, in one example, this can include inputting the VIN into an application for computing property tax or registration fees for a vehicle associated with the specific VIN, and the additional vehicle data can be requested from a vehicle information system, which may be remotely located with respect to the application. At 1504, a vehicle valuation/configuration is determined based on additional vehicle data and/or VIN-encoded data. As described, the additional vehicle data can relate to comprehensive original vehicle data obtained based on the VIN (e.g., by obtaining manufacturer codes associated with the VIN, determining option descriptions, codes, etc. associated with the manufacturer codes, trim level, model, or other information encoded in the VIN or otherwise obtainable based on the VIN from manufacturer provided information, supplemental vehicle data, etc., and/or the like). Thus, the vehicle can be identified in terms of its build level configuration based at least in part on the additional vehicle data, and/or the valuation at 1504 can then correlate to the build level configuration. In one example, the vehicle valuation can be determined at 1504 by a third-party evaluator or evaluation application by providing the additional vehicle data, VIN, VIN-encoded data, etc. thereto for receiving the valuation.

At 1506, a property tax or vehicle registration fee can be generated based on the vehicle valuation/configuration. In this regard, the property tax or vehicle registration fee is based on the additional vehicle data, whether based on the data itself or a valuation computed therefrom, to provide a more accurate value in determining the tax or fee. Generating the property tax or vehicle registration fee can include specifying the valuation or the additional vehicle data, VIN-encoded data, etc., to a backend system that determines values for property tax or vehicle registration fees. At 1508, the property tax or vehicle registration fee is outputted. For example, this can include displaying the tax or fee on a display, indicating the tax or fee to another system, printing a remittance indicating the tax or fee, etc.

Figure 16:
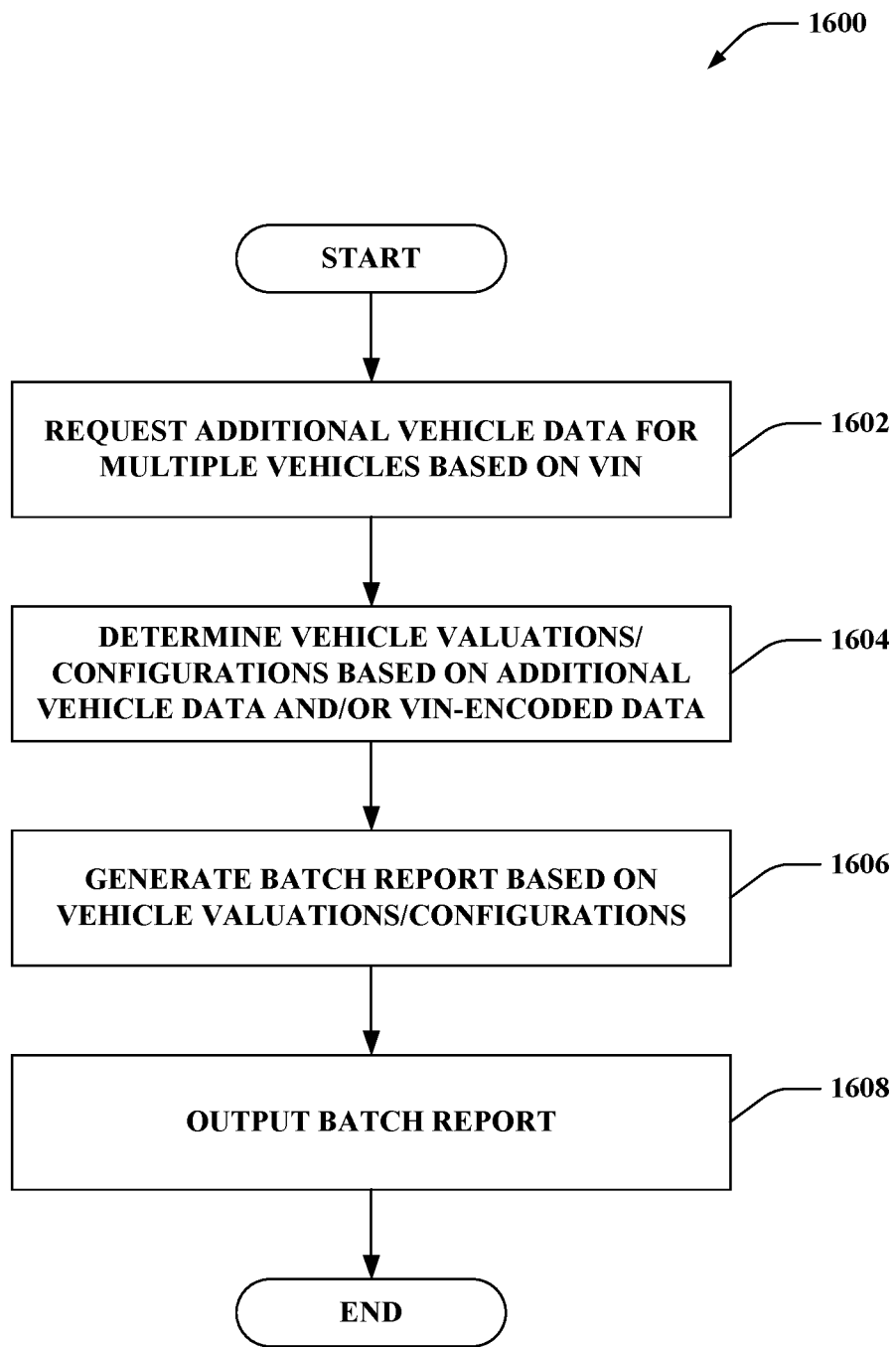
FIG. 16 is an aspect of an example methodology for batch processing vehicle valuations based at least in part on additional vehicle data.

FIG. 16 illustrates an example methodology 1600 for batch processing vehicle valuations based at least in part on additional vehicle data. At 1602, additional vehicle data can be requested for multiple vehicles based on VIN. As described, in one example, this can include inputting the VINs into an application for generating batch vehicle valuations associated with specific VINs, and the additional vehicle data can be requested from a vehicle information system, which may be remotely located with respect to the application. At 1604, vehicle valuations/configurations are determined based on additional vehicle data and/or VIN-encoded data for the multiple vehicles. As described, the additional vehicle data can relate to comprehensive original vehicle data obtained based on the VINs (e.g., by obtaining manufacturer codes associated with the VINs, determining option descriptions, codes, etc. associated with the manufacturer codes, trim level, model, or other information encoded in the VINs or otherwise obtainable based on the VINs from manufacturer provided information, supplemental vehicle data, etc., and/or the like). Thus, the vehicles can be identified in terms of their build level configuration based at least in part on the additional vehicle data, and/or the valuations at 1604 can then correlate to the build level configurations. In one example, the vehicle valuations can be determined at 1604 by a third-party evaluator or evaluation application by providing the additional vehicle data, VINs, VIN-encoded data, etc. thereto for receiving the valuation. At 1606, a batch report of vehicle valuations/configurations can be generated, and at 1608, the batch report is outputted. For example, this can include displaying the batch report, providing the batch report to one or more other systems (e.g., the systems described herein for generating auto insurance information, loan information, descriptive listings, etc.), and/or the like.

Figure 17:
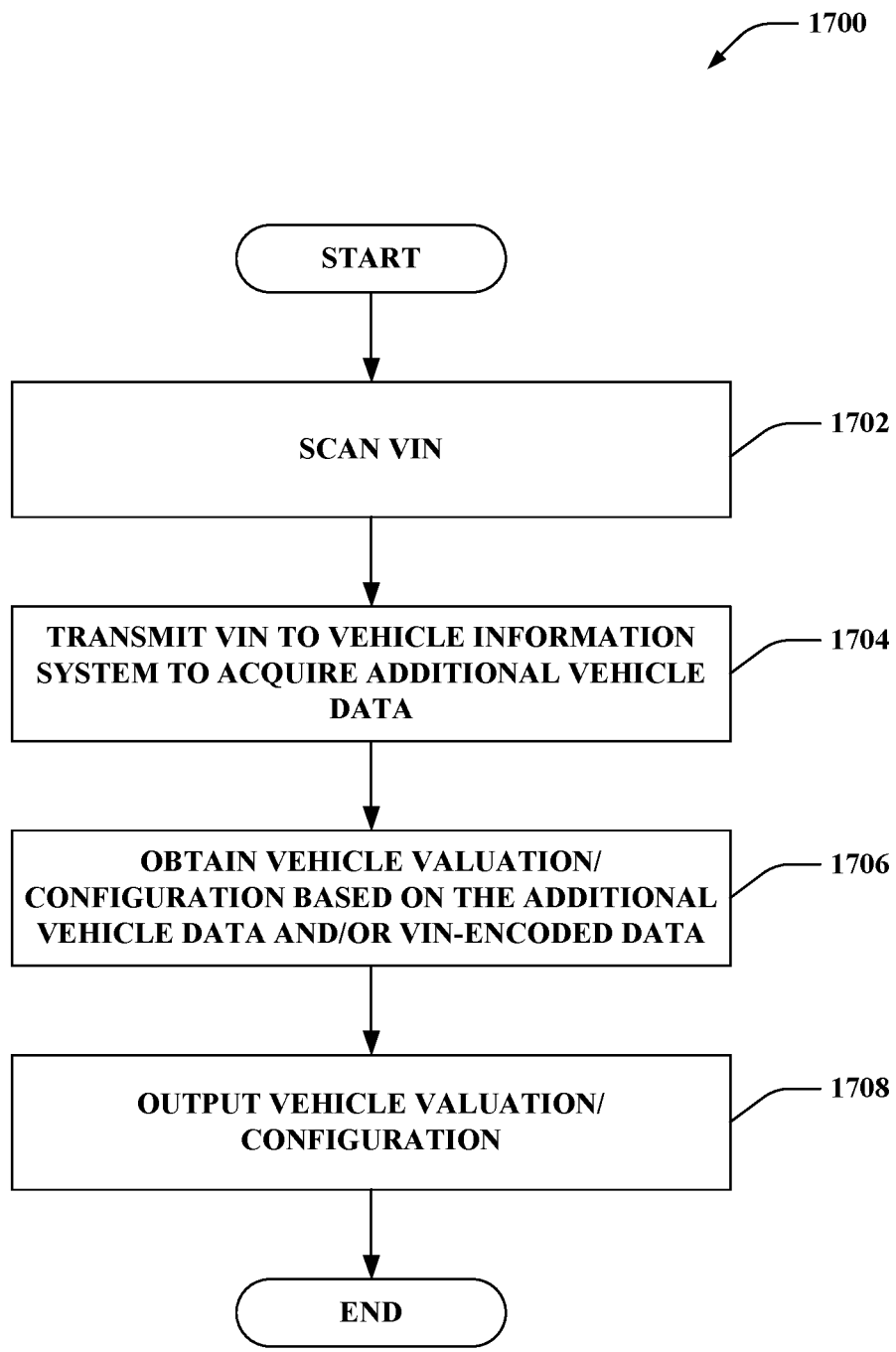
FIG. 17 is an aspect of an example methodology for obtaining a vehicle valuation/configuration based in part on scanning a vehicle identification number of the vehicle.

FIG. 17 illustrates an example methodology 1700 for obtaining a vehicle valuation/configuration based in part on scanning a VIN of the vehicle. At 1702, a VIN can be scanned. For example, the VIN is scanned using a user device that executes an application for obtaining a vehicle valuation/configuration, real-time insurance rate quotes, real-time loan estimates, etc. As described, the VIN can be encoded in a barcode on the vehicle such that the user can scan the barcode to obtain the VIN. In this regard, the user can obtain valuation, insurance information, loan information, etc. while shopping on a vehicle lot. At 1704, the VIN can be transmitted to a vehicle information system to acquire additional vehicle data. As described, the additional vehicle data can relate to comprehensive original vehicle data obtained based on the VIN (e.g., by obtaining manufacturer codes associated with the VIN, determining option descriptions, codes, etc. associated with the manufacturer codes, trim level, model, or other information encoded in the VIN or otherwise obtainable based on the VIN from manufacturer provided information, supplemental vehicle data, etc., and/or the like). Moreover, the transmitting can occur over one or more networks over which a user device and vehicle information system can communicate. At 1706, a vehicle valuation/configuration is obtained based on additional vehicle data and/or VIN-encoded data. In one example, the vehicle valuation can be determined at 1706 by a third-party evaluator or evaluation application by providing the additional vehicle data, VIN, VIN-encoded data, etc. thereto (e.g., over one or more networks) for receiving the valuation. At 1708, the vehicle valuation/configuration is outputted. The output can include output to a display of the application, output to a loan originating system, output to an auto insurance quoting system, etc.

Figure 18:
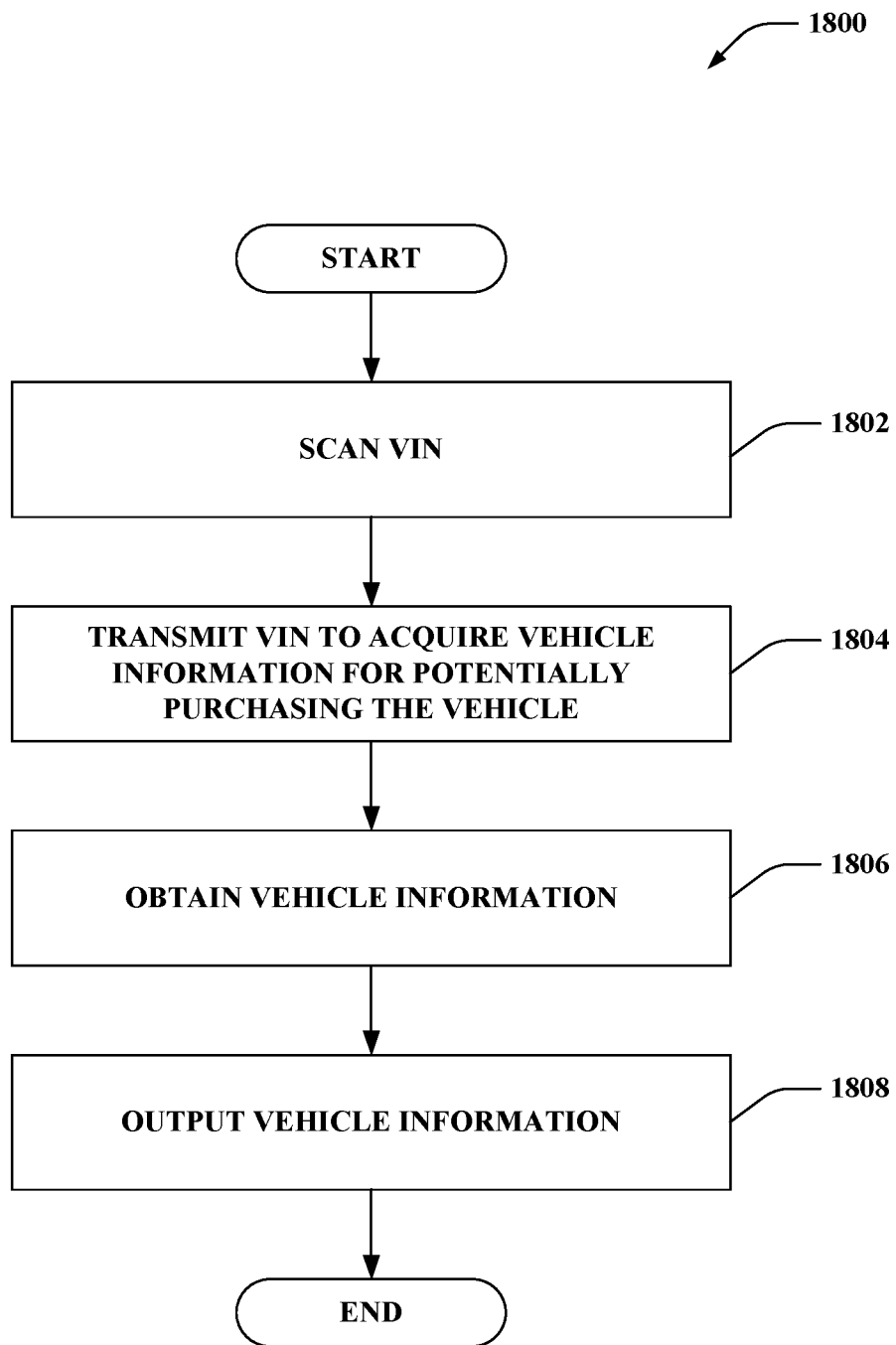
FIG. 18 is an aspect of an example methodology for obtaining vehicle information for purchasing a vehicle based in part on scanning a vehicle identification number of the vehicle.

FIG. 18 illustrates an example methodology 1800 for obtaining vehicle information related to purchasing a vehicle. At 1802, a VIN can be scanned. For example, the VIN is scanned using a user device that executes an application for obtaining specific vehicle information, such as real-time insurance rate quotes, real-time loan estimates, etc. that can be further based on information previously obtained or provided (e.g., credit history, accident history, driving records, etc.). As described, the VIN can be encoded in a barcode on the vehicle such that the consumer can scan the barcode to obtain the VIN. In this regard, the consumer can obtain valuation, insurance information, loan information, etc. while shopping on a vehicle lot.

At 1804, the VIN can be transmitted to acquire vehicle information for potentially purchasing the vehicle. For example, this can include transmitting the vehicle information to an insurance system that provides insurance quotes for certain drivers and certain vehicle, a lending system that generates loan approvals from consumer pre-approvals and based on an actual vehicle, and/or the like. It is to be appreciated that the entity receiving the VIN at 1804 can generate or otherwise obtain a vehicle valuation and/or configuration as described herein in generating the vehicle information relating to purchase. Thus, for example, a lending system may obtain a vehicle valuation for the vehicle specific to the VIN (e.g., based on additional vehicle data, etc.) and consider a credit report of a specific consumer in generating the vehicle information, which may include approved loan amount, interest rate, etc.

At 1806, the vehicle information can be obtained (e.g., from the entity receiving the VIN), and at 1808 the vehicle information can be output. Thus, a consumer can utilize this specific vehicle information in deciding whether to purchase the vehicle (e.g., based on credit approval, insurance rate, etc.). In some examples, as described, outputting the vehicle information at 1808 can include outputting the information to one or more personal devices of the consumer.

While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. A computer-implemented method for determining an online decision associated with a vehicle, comprising utilizing at least one processor for:
   receiving an electronic data package from a remote system via one or more electronic communication channels to be used in automatically generating an online decision associated with an online decisioning application, the electronic data package storing a vehicle identifier related to a vehicle;
   retrieving one or more manufacturing codes of a plurality of manufacturer codes indicating a build level configuration of the vehicle based at least in part on the vehicle identifier;
   evaluating the vehicle identifier stored in the electronic data package to automatically select one or more mapping tables of a plurality of mapping tables stored in a mapping database, wherein the selected one or more mapping tables define a relationship of the one or more manufacturing codes to one or more specific properties of an application;
   automatically generating a vehicle options data package comprising application-specific vehicle options based at least in part on the selected one or more mapping tables, the vehicle identifier, and the one or more manufacturing codes; and
   automatically exposing the vehicle options data package for allowing or for disallowing the online decision.

2. The computer-implemented method of claim 1, wherein the vehicle identifier comprises a vehicle identification number assigned by the vehicle's manufacturer.

3. The computer-implemented method of claim 1, wherein the online decisioning application is configured to at least one of: provide a valuation decision related to the vehicle, provide an insurance policy premium decision related to the vehicle, provide a lending decision related to the vehicle, provide an auction pricing decision for the vehicle, or determine a property tax decision, based at least in part on the vehicle options data package.

4. A non-transitory computer-readable medium for storing code for causing processing circuitry to perform:
   receiving an electronic data package from a remote system via one or more electronic communication channels to be used in automatically generating an online decision associated with an online decisioning application, the electronic data package storing a vehicle identifier related to a vehicle;
   retrieving one or more manufacturing codes of a plurality of manufacturer codes indicating a build level configuration of the vehicle based at least in part on the vehicle identifier;
   evaluating the vehicle identifier stored in the electronic data package to automatically select one or more mapping tables of a plurality of mapping tables stored in a mapping database, wherein the selected one or more mapping tables define a relationship of the one or more manufacturing codes to one or more specific properties of an application;
   automatically generating a vehicle options data package comprising application-specific vehicle options based at least in part on the selected one or more mapping tables, the vehicle identifier, and the one or more manufacturing codes; and
   automatically exposing the vehicle options data package for allowing or for disallowing the online decision.

5. The non-transitory computer-readable medium of claim 4, wherein the vehicle identifier is a vehicle identification number assigned by the vehicle's manufacturer.

6. The non-transitory computer-readable medium of claim 4, wherein the online decisioning application is configured to at least one of: provide a valuation decision related to the vehicle, provide an insurance policy premium decision related to the vehicle, provide a lending decision related to the vehicle, provide an auction pricing decision for the vehicle, or determine a property tax decision, based at least in part on the vehicle options data package.

* * * * *